US012353191B2

(12) United States Patent
Marinov et al.

(10) Patent No.: US 12,353,191 B2
(45) Date of Patent: *Jul. 8, 2025

(54) CONVERSION OF MESH GEOMETRY TO EDITABLE AND WATERTIGHT BOUNDARY REPRESENTATION IN COMPUTER AIDED DESIGN

(71) Applicant: Autodesk, Inc., San Francisco, CA (US)

(72) Inventors: Martin Cvetanov Marinov, Cambridge (GB); Peter Hugh Charrot, Cambridge (GB); Suguru Furuta, Cambridge (GB); Nandakumar Santhanam, Ithaca, NY (US); Justin Nicholas Hallet, North Warrandyte (AU); Stephen Alan Barley, Cambridge (GB); Jean Alison Flower, Uckfield (GB); Gordon Thomas Finnigan, Harvard, MA (US); Siavash Navadeh Meshkat, Carlsbad, CA (US); Iain Edward Henley, Great Chesterford (GB); Tristan Ward Barback, Cambridge (GB); Maciej Sapun, Stalowa Wola (PL); Marco Amagliani, Cambridge (GB); Pawel Wolski, Cracow (PL)

(73) Assignee: Autodesk, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/537,713

(22) Filed: Dec. 12, 2023

(65) Prior Publication Data

US 2024/0168460 A1    May 23, 2024

Related U.S. Application Data

(63) Continuation of application No. 17/229,320, filed on Apr. 13, 2021, now Pat. No. 11,886,165, which is a
(Continued)

(51) Int. Cl.
*G05B 19/4099*      (2006.01)
*B23Q 3/16*         (2006.01)
(Continued)

(52) U.S. Cl.
CPC .......... *G05B 19/4099* (2013.01); *B23Q 3/16* (2013.01); *B29C 64/393* (2017.08); *B33Y 50/00* (2014.12);
(Continued)

(58) Field of Classification Search
CPC ...... G05B 19/4099; G05B 2219/35134; G05B 2219/49007; G06F 2113/10; G06F 30/10;
(Continued)

(56) References Cited

U.S. PATENT DOCUMENTS 8,970,590 B1   3/2015   Brennan et al.
9,697,326 B1   7/2017   Bowman et al.
(Continued)

FOREIGN PATENT DOCUMENTS

CN   103617603   3/2014
CN   106204748   12/2016
WO   WO 2017142953   8/2017

OTHER PUBLICATIONS

Notice of Allowance in Chinese Appln. No. 201980073804.5, dated Mar. 13, 2024, 8 pages (with English translation).
(Continued)

*Primary Examiner* — Chun Cao
(74) *Attorney, Agent, or Firm* — Fish & Richardson P.C.

(57) ABSTRACT

Methods, systems, and apparatus, including medium-encoded computer program products, for computer aided
(Continued)

design of physical structures include, in at least one aspect, a fully automatic method of converting a generative design into an editable, watertight B-Rep by leveraging the generative solver input and representation to: (1) embed the exact input solid boundary surfaces where the design coincides with the input, (2) approximate everywhere else the design boundary with globally smooth, editable "organic" surfaces, and (3) join all surfaces to form a generative design output B-Rep.

57 Claims, 11 Drawing Sheets

Related U.S. Application Data continuation of application No. PCT/US2019/034221, filed on May 28, 2019.

(60) Provisional application No. 62/758,053, filed on Nov. 9, 2018.

(51) Int. Cl.
| | |
|---|---|
| *B29C 64/393* | (2017.01) |
| *B33Y 50/00* | (2015.01) |
| *B33Y 50/02* | (2015.01) |
| *G06F 30/10* | (2020.01) |
| *G06F 113/10* | (2020.01) |
| *G06F 119/18* | (2020.01) |

(52) U.S. Cl.
CPC .............. *B33Y 50/02* (2014.12); *G06F 30/10* (2020.01); *G05B 2219/35134* (2013.01); *G05B 2219/49007* (2013.01); *G06F 2113/10* (2020.01); *G06F 2119/18* (2020.01)

(58) Field of Classification Search
CPC ...... G06F 2119/18; G06F 30/00; G06F 30/20; G06F 30/27; B33Y 50/02; B33Y 50/00; B29C 64/393
USPC .......................................................... 700/98
See application file for complete search history.

(56) References Cited

U.S. PATENT DOCUMENTS

| | | | |
|---|---|---|---|
| 9,902,114 | B2 | 2/2018 | Musuvathy |
| 10,339,226 | B2 * | 7/2019 | Schmitter ............... G06T 17/30 |
| 10,467,807 | B1 * | 11/2019 | Strater ................... B33Y 50/00 |
| 10,599,809 | B2 | 3/2020 | Urick et al. |
| 10,810,795 | B2 * | 10/2020 | Sederberg ............... G06T 17/30 |
| 10,974,446 | B2 | 4/2021 | Nosenzo et al. |
| 11,016,470 | B2 * | 5/2021 | Marinov ............... B29C 64/393 |
| 11,886,165 | B2 | 1/2024 | Marinov et al. |
| 2003/0191554 | A1 | 10/2003 | Russell et al. |
| 2011/0087350 | A1 | 4/2011 | Fogel et al. |
| 2012/0029882 | A1 | 2/2012 | Bommes et al. |
| 2013/0300735 | A1 | 11/2013 | Schmidt |
| 2016/0133049 | A1 | 5/2016 | Hill et al. |
| 2016/0224693 | A1 | 8/2016 | Maisonneuve |
| 2017/0037518 | A1 | 2/2017 | Oxford et al. |
| 2017/0357736 | A1 | 12/2017 | Schmitter et al. |
| 2018/0120478 | A1 | 5/2018 | Imhof |
| 2019/0303532 | A1 | 10/2019 | Urick et al. |
| 2020/0150624 | A1 | 5/2020 | Marinov et al. |
| 2020/0151953 | A1 | 5/2020 | Strater et al. |
| 2021/0232120 | A1 | 7/2021 | Marinov et al. |
| 2021/0263499 | A1 | 8/2021 | Marinov et al. |

OTHER PUBLICATIONS

Alliez et al., "3D Fast Intersection and Distance Computation", CGAL User and Reference Manual 3, 2016.

Alliez et al., "Anisotropic polygonal remeshing", ACM SIGGRAPH 2003 Papers, 2003, pp. 485-493.

Authorized officer Katarzyna Nesciobello, International Search Report and Written Opinion in PCT/US2019/034221, mailed Sep. 23, 2019, 17 pages.

Authorized officer Katarzyna Nesciobello, International Search Report and Written Opinion in PCT/US2019/060589, mailed Mar. 31, 2020, 16 pages.

Autodesk Dreamcatcher. Project Dreamcatcher | Autodesk Research. https://autodeskresearch.com/projects/dreamcatcher.

Autodesk PowerShape. PowerShape | Manufacturing CAD Software for Complex Parts | Autodesk. https://www.autodesk.com/products/powershape/overview#.

Bajaj et al., "Reconstructing Surfaces and Functions on Surfaces from Unorganized Three-Dimensional Data", Algorithmica (New York), Sep. 1997, 19(1):243-261.

Benko et al., "Algorithms for reverse engineering boundary representation models", Comput. Des., Sep. 2001, 33(11): 839-851.

Biermann et al., "Approximate Boolean Operations on Free-form Solids", in: Proc. of SIGGRAPH 01, 2001, pp. 185-194. URL https://mrl.nyu.edu/publications/booleans/booleans2001.pdf.

Biermann et al., "Sharp Features on Multiresolution Subdivision Surfaces", Graphical Models 64 (2) (2002) 61-77. doi:10.1006/gmod.2002.0570. URL http://linkinghub.elsevier.com/retrieve/pii/S1524070302905709.

Bommes et al., "Integer-grid Maps for Reliable Quad Meshing", ACM Transactions on Graphics 32 (4) (2013) 1. doi:10.1145/2461912.2462014. URL http://dl.acm.org/citation.cfm?doid=2461912.2462014.

Bommes et al., "Mixed-integer Quadrangulation", ACM Transactions on Graphics 28 (3) (2009) 1. doi:10.1145/1531326.1531383. URL http://portal.acm.org/citation.cfm?doid=1531326.1531383.

Brackett et al., "Topology optimization for additive manufacturing", Proceedings of the Solid Freeform Fabrication Symposium, 2011, pp. 348-362.

Campen et al., "Aligned Parameterization", Computer Graphics Forum 33 (8) (2014) 69-81.

Campen et al., "Quantized Global Parametrization", ACM Transactions on Graphics 34 (6) (2015) 1-12. doi:10.1145/2816795.2818140. URL http://dl.acm.org/citation.cfm?doid=2816795.2818140.

Cohen-Steiner et al., "Restricted delaunay triangulations and normal cycle", Proceedings of the 19th Annual Symposium on Computational Geometry, 2003, 312-321.

Cohen-Steiner et al., "Variational shape approximation", Proc. of ACM SIGGRAPH 04, 2004, 23(3):905-914.

Coons, "Surfaces for Computer-aided Design of Space Forms", Technical Report (1967). URL https://dl.acm.org/citation.cfm?id=889976.

Eck et al., "Automatic Reconstruction of B-spline Surfaces of Arbitrary Topological Type", in: Proceedings of the 23rd annual conference on Computer graphics and interactive techniques—SIGGRAPH '96, 1996, pp. 325-334. doi:10.1145/237170.237271. URL http://portal.acm.org/citation.cfm?doid=237170.237271.

Garland et al., "Hierarchical Face Clustering on Polygonal Surfaces", 2001 ACM Symposium on Interactive 3D Graphics, 2001, pp. 49-58.

Gregory et al., "A C1 Triangular Interpolation Patch for Computer-aided Geometric Design", Computer Graphics and Image Processing 13(1) (1980) 80-87. doi:10.1016/0146-664X(80)90117-3. URL https://www.sciencedirect.com/science/article/pii/0146664X80901173.

Hachenberger et al., "{3D} Boolean Operations on Nef Polyhedra" {CGAL} User and Reference Manual. CGAL Editorial Board.

Hoppe et al., "Piecewise smooth surface reconstruction", Proceedings of the 21st Annual Conference on Computer Graphics and Interactive Techniques—SIGGRAPH, 1994, pp. 295-302.

Hoppe et al., "Surface reconstruction from unorganized points", ACM SIGGRAPH Computer Graphics, 1992, 26(2):71-78.

Jackson, "Boundary Representation Modelling with Local Tolerances," Dec. 1995, SMA '95: Proceedings of the third ACM symposium on Solid modeling and applications, pp. 247-254, source: https://doi.org/10.1145/218013.218067 (Year: 1995).

(56) References Cited

OTHER PUBLICATIONS

Joshi et al., A. Yurova, "CAD-integrated Topology Optimization", (Dec. 31, 2016), XP055621476, retrieved from the Internet: URL:https://www5.in.tum.de/pub/bgceproject2016report.pdf), 77 pages.
Ju et al., "Dual Contouring of Hermite Data", Proceedings of the 29th Annual Conference on Computer Graphics and Interactive Techniques, 2002, pp. 339-346.
Knoppel et al., "Globally Optimal Direction Fields", ACM Transactions on Graphics, 2013, 32(4):1-10.
Kobbelt et al., "Feature Sensitive Surface Extraction from Volume Data", Proceedings of the 28th Annual Conference on Computer Graphics and Interactive Techniques, 2001, pp. 57-66.
Krishnamurthy et al., "Fitting smooth surfaces to dense polygon meshes" Proceedings of the 23rd annual conference on Computer graphics and interactive techniques—SIGGRAPH '96, ACM Press, 313-324.
Kruth et al., "Reverse engineering modelling of free-form surfaces from point clouds subject to boundary conditions", J. Mater. Process. Technol., Apr. 1998, 76(1-3):120-127.
Lai et al., "Blending of mesh objects to parametric surface", Comput. Graph, Feb. 2015, 46( C ): 283-293.
Levin, "Combined Subdivision Schemes for the Design of Surfaces Satisfying Boundary Conditions", preprint submitted to Elsevier Preprint (Nov. 23, 1998). URL http://citeseerx.ist.psu.edu/viewdoc/download?doi=10.1.1.16.4022&rep=rep1&type=pdf.
Levin, "Interpolating Nets of Curves by Smooth Subdivision Surfaces", Proceedings of the 26th annual conference on Computer graphics and interactive techniques—SIGGRAPH '99 (1999) 57-64 doi:10.1145/311535.311541. URL http://portal.acm.org/citation.cfm?doid=311535.311541.
Li et al., "Automatic and Interactive Mesh to T-spline Conversion", in: Proceedings of the Fourth Eurographics Symposium on Geometry Processing, 2006, pp. 191-200. doi:10.1145/1281957.1281982. URL http://dl.acm.org/citation.cfm?id=1281957.1281982.
Limitstate3d.com [online], "Limitstate:Form", published on or before Apr. 12, 2021, retrieved on May 5, 2021, retrieved from URL<http://limitstate3d.com/.>, 4 pages.
Litke et al., "Fitting Subdivision Surfaces", in: IEEE Visualization 2001, 2001, pp. 319-324. URL http://www.multires.caltech.edu/pubs/fitting.pdf.
Litke et al., "Trimming for Subdivision Surfaces", Computer-Aided Geometric Design 18 (5) (2001) 463-481. URL http://www.multires.caltech.edu/pubs/trimming.pdf.
Ma et al., "A direct approach for subdivision surface fitting from a dense triangle mesh", Comput. Des., May 2004, 36(6):525-536.
Mangan et al., "Partitioning 3D surfaces meshes using watershed segmentation", IEEE Trans. Vis. Comput. Graph., 1999, 5(4):308-321.
Marinov et al., "Generative Design Conversion to Editable and Watertight Boundary Representation," Computer-Aided Design, May 2019, 115:194-205.
Marinov et al., "Automatic generation of structure preserving multiresolution models", Comput. Graph. Forum, 2005, 24(3):479-489.
Marinov et al., "Optimization Methods for Scattered Data Approximation with Subdivision Surfaces", Graphical Models, 2005, 67(5):452-473.
Marinov et al., "Optimization techniques for approximation with subdivision surfaces", ACM Symposium on Solid Modeling and Applications, 2004, p. 10.
Marinov et al., "Boundary Conforming Mesh to T-NURCC Surface Conversion," Computers & Graphics, May 2019, 82:95-105.
Mscsoftware.com [online], "MSC Nastran: Multidisciplinary Structural Analysis", published on or before Apr. 12, 2021, retrieved on May 5, 2021, retrieved from URL<http://www.mscsoftware.com/product/msc-nastran>, 5 pages.
Myles et al., "Robust field-aligned global parametrization", ACM Transactions on Graphics, 2014, 33(4):1-14.
Peterson, "Arc Length Parameterization of Spline Curves", Journal of Computer-Aided Design 14 (2) (2006) 1-11.

plm.automation.siemens.com [online], "Convergent Modeling", published on or before Apr. 12, 2021, retrieved on May 5, 2021, retrieved from URL<https://www.plm.automation.siemens.com/global/en/our-story/glossary/convergent-modeling/24461>, 3 pages.
plm.automation.siemens.com [online], "Parasolid", published on or before Apr. 12, 2021, retrieved on May 5, 2021, retrieved from URL<https://www.plm.automation.siemens.com/global/en/products/plm-components/parasolid.html>, 8 pages.
plm.automation.siemens.com [online], "PLM Components", published on or before Apr. 12, 2021, retrieved on May 5, 2021, retrieved from URL<https://www.https://www.plm.automation.siemens.com/global/en/products/plm-components/>, 7 pages.
PTC.com [online], "Innovate Faster with Generative Design and AI", published on or before Apr. 12, 2021, retrieved on May 5, 2021, retrieved from URL<https://www.frustum.com/product>, 12 pages.
Ray et al., "Periodic Global Parameterization", ACM Transactions on Graphics, 2006, 25(4):1460-1485.
Rouhani et al., "Implicit B-Spline Surface Reconstruction", IEEE Trans. Image Process., Jan. 2015, 24(1):22-32.
Sabin, "Transfinite Surface Interpolation", in: Proceedings of the 6th IMA Conference on the Mathematics of Surfaces, Clarendon Press, New York, NY, USA, 1996, pp. 517-534.
Scott et al., "Local refinement of analysis-suitable T splines", Computer Methods in Applied Mechanics and Engineering 213-216 (2012) 206 222.
Sederberg et al., "T-spline simplification and local refinement", in: ACM SIGGRAPH 2004 Papers on—SIGGRAPH '04, 2004, p. 276. doi:10.1145/1186562.1015715. URL http://portal.acm.org/citation.cfm?doid=1186562.1015715.
Sederberg et al., "T-splines and T-NURCCs", in: ACM Transactions on Graphics, vol. 22, 2003, p. 477. doi:10.1145/882262.882295. URL http://portal.acm.org/citation.cfm?doid=882262.882295.
Sederberg et al., "Watertight Trimmed NURBS", in: ACM SIGGRAPH 2008 papers on—SIGGRAPH '08, vol. 27, ACM Press, New York, New York, USA, 2008, p. 1. doi:10.1145/1399504.1360678. URL http://portal.acm.org/citation.cfm?doid=1399504.1360678.
Sharpe et al., "Numerical method for extracting an arc length parameterization from parametric curves", Computer-Aided Design 14 (2) (1982) 79-81.
Shen et al., "Converting a CAD Model into a Non-uniform Subdivision Surface", Computer Aided Geometric Design 48 (2016) 17-35. doi:10.1016/j.cagd.2016.07.003. URL https://linkinghub.elsevier.com/retrieve/pii/S0167839616300899.
Siemens.com [online], "PLM Components: 3D Software Development Toolkits for CAD, CAM, CAE and Robotics", published on or before Apr. 12, 2021, retrieved on Apr. 14, 2021, retrieved from URL<https://www.plm.automation.siemens.com/en/products/open/d-cubed/cdm/index.shtml>, 11 pages.
Sigmund and Maute, "Topology Optimization Approaches—a Comparative Review," Struct. Multidisc. Optim. (2013) 48:1031-1055.
Taubin, "A Signal Processing Approach to Fair Surface Design", Proceedings of ACM SIGGRAPH, 1995, 351-358.
Unknown Author, "Topology Optimization R18.0 Feature and Usage Highlights Additive Manufacturing Application", (Mar. 12, 2017), XP055621368, retrieved from the Internet: URL:https://www.fluidcodes.com/archives/products/1489307672-Topology%20Optimization%20180%20Features.pdf, 29 pages.
Van Dijk et al., "Level-set Methods for Structural Topology Optimization: a Review," Struct. Multidisc. Optim. (2013) 48:437-472.
Wang et al., "Adaptive T-spline Surface Approximation of Triangular Meshes", in: 2007 6th International Conference on Information, Communications and Signal Processing, ICICS, IEEE, 2007, pp. 1-5. doi:10.1109/ICICS.2007.4449775. URL http://ieeexplore.ieee.org/document/4449775/.
Wu et al., "Structure recovery via Hybrid Variational Surface Approximation", Comput. Graph. Forum, Sep. 2005, 24(3):277-284.
Wu et al., "Variational reconstruction using subdivision surfaces with continuous sharpness control", Comput. Vis. Media, Sep. 2017, 3(3):217-228.
Yan et al., "Quadric Surface Extraction by Variational Shape Approximation", Springer, Berlin, Heidelberg, 2006, pp. 73-86.

(56) References Cited

OTHER PUBLICATIONS

Yan et al., "Variational mesh segmentation via quadric surface fitting", Comput. Design., Nov. 2012, 44(11):1072-1082.
Zhang et al., "A wave based anisotropic quadrangulation method", ACM SIGGRAPH 2010, pp. 1-8.

* cited by examiner

CONVERSION OF MESH GEOMETRY TO EDITABLE AND WATERTIGHT BOUNDARY REPRESENTATION IN COMPUTER AIDED DESIGN

CROSS-REFERENCE TO RELATED APPLICATIONS

This application is a continuation and claims priority to U.S. application Ser. No. 17/229,320, entitled CONVERSION OF GENERATIVE DESIGN GEOMETRY TO EDITABLE AND WATERTIGHT BOUNDARY REPRESENTATION IN COMPUTER AIDED DESIGN, filed on Apr. 13, 2021, and issued as U.S. Pat. No. 11,886,165 on Jan. 30, 2024, which is a continuation of PCT Application No. PCT/US2019/034221, entitled CONVERSION OF GENERATIVE DESIGN GEOMETRY TO EDITABLE AND WATERTIGHT BOUNDARY REPRESENTATION IN COMPUTER AIDED DESIGN, and filed on May 28, 2019, which claims the benefit of priority to U.S. Provisional Application No. 62/758,053, entitled CONVERSION OF GENERATIVE DESIGN GEOMETRY TO EDITABLE AND WATERTIGHT BOUNDARY REPRESENTATION IN COMPUTER AIDED DESIGN, and filed on Nov. 9, 2018. The disclosures of the prior applications are considered part of and are incorporated by reference in the disclosure of this application.

BACKGROUND

This specification relates to computer aided design of physical structures, which can be manufactured using additive manufacturing, subtractive manufacturing and/or other manufacturing systems and techniques.

Computer Aided Design (CAD) software has been developed and used to generate three-dimensional (3D) representations of objects, and Computer Aided Manufacturing (CAM) software has been developed and used to manufacture the physical structures of those objects, e.g., using Computer Numerical Control (CNC) manufacturing techniques. Typically, CAD software stores the 3D representations of the geometry of the objects being modeled using a boundary representation (B-Rep) format. In a boundary representation model (B-Rep), geometry is stored in the computer using smooth and precise mathematical surfaces, in contrast to the discrete and approximate surfaces of a mesh model.

In addition, CAD software has been designed so as to perform automatic generation of 3D geometry (generative design) for a part or one or more parts in a larger system of parts to be manufactured. This automated generation of 3D geometry is often limited to a design space specified by a user of the CAD software, and the 3D geometry generation is typically governed by design objectives and constraints, which can be defined by the user of the CAD software or by another party and imported into the CAD software. The design objectives (such as minimizing the waste material or weight of the designed part) can be used to drive the geometry generation process toward better designs. The design constraints can include both structural integrity constraints for individual parts (i.e., a requirement that a part should not fail under the expected structural loading during use of the part) and physical constraints imposed by a larger system (i.e., a requirement that a part not interfere with another part in a system during use). Further, the inputs to a generative design process can include a set of input solids (B-Rep input) that specify boundary conditions for the generative design process, but many modern generative design solvers do not operate directly on the exact surface boundary representation of their input solids. Instead, B-Reps are sampled and replaced with volumetric representations such as level sets or tetrahedral or hexahedral meshes, which are significantly more convenient and efficient for the physical simulations and material synthesis computed by the solver.

SUMMARY

The conversion by generative design solvers of their input solids to volumetric representations introduces a loss of surface precision due to the limitations of the target representation. FIG. 2 shows an example of this, where the generative mesh segment 200 is extracted from a level set 0-isosurface meant to represent the overlaid semi-transparent solid 205. The accuracy loss is especially apparent near the solid sharp edges 210 and holes 215. While this loss is negligible in the context of the solver computations, in general it prevents the output of a generative design from representing sufficiently accurately the input solid surface geometry away from the organic material synthesized by the solver. Subsequently, when integrating the solver output within the complete model assembly, these surface inaccuracies often cause issues such as part interferences and manufacturing defects or anomalies. FIG. 3 shows an example of this for two versions 300, 320 of a model. A rod 305, which has been designed to fit through the holes of the input solids 310, fits properly when assembled with a generative B-Rep in accordance with the present disclosure, which reuses the input geometry. In contrast, a general surface reconstruction 325 violates the generative constraints causing interferences 330 with the rod. Note that the generative design geometry constraints can include solid B-Reps, such as the input solids 310, and are placed in a $\mathbb{R}^3$ optimization domain to avoid interference (keep-out) and specify attachment joints (keep-in) with other parts in a CAD assembly.

To resolve these inaccuracies in the generative design geometry, the fully automatic method of the present disclosure converts a generative design into an editable, watertight B-Rep by leveraging the generative solver input and representation to: (1) embed the exact input solid boundary surfaces where the design coincides with the input, (2) approximate everywhere else the design boundary with globally smooth, editable "organic" surfaces, and (3) join all surfaces to form a generative design output B-Rep. FIG. 1 shows an overview example of the process. Input solids 100 are provided to the generative design solver, which converts the input solids 100 into a level set representation and operates on this level set representation to automatically produce new geometry that connects the input geometry. The new geometry is extracted from the 0-isosurface of the level set representation to produce an extracted mesh 110, which is partitioned into incident and organic parts 112, 114, respectively. T-Spline surfaces 120 are constructed for the organic part 114, and a final output watertight B-Rep 130 is composed from the input solids 100 and the organic T-Spline surfaces 120.

Note that the presently disclosed methods are applicable to generative designs that represent arbitrary combinations of material additions and subtractions and leverage the solver geometry representation. Moreover, although the example above references T-Spline surfaces 120, it will be appreciated that one or more different types of editable smooth surface representations can be used in respective implementations. For example, the surfaces 120, which are constructed for the organic part 114, can be Non-Uniform Rational Catmull-Clark Surfaces with T-junctions (T-NURCC) surfaces 120. Suitable variations in geometry formats that can be used for the editable smooth surface representations can include T-NURCCs, T-splines, LR B-splines, and/or hierarchical B-splines. In addition, the initially constructed, editable smooth surfaces 120 can merged (where possible) to produce a simpler patch layout 125 before composition with the input solids 100 to form the final output watertight B-Rep 130. For example, patches of initially constructed T-Spline and/or T-NURCC surfaces 120 can be merged to produce T-Spline and/or T-NURCC surfaces 125, as shown in FIG. 1.

In general, one or more aspects of the subject matter described in this specification can be embodied in one or more methods, including, obtaining, in a computer aided design program, a first three-dimensional model of an object to be manufactured, wherein the first three-dimensional model includes a polygon mesh resulting from a generative design process employing one or more input solids as one or more sub-spaces of an optimization domain of the generative design process, the one or more input solids being in a boundary representation format; partitioning, by the computer aided design program, the polygon mesh into a first portion that is incident with the one or more input solids and a second portion that is not incident with the one or more input solids; constructing, by the computer aided design program, one or more editable smooth surfaces for the second portion of the polygon mesh, wherein each of the one or more editable smooth surfaces has a globally smooth parameterization, which permits globally smooth free-form surface editing; modifying, by the computer aided design program, one or more boundaries of the one or more editable smooth surfaces to contact the one or more input solids at one or more contact curves that are homeomorphic to an unmodified boundary between the one or more modified smooth surfaces and the one or more input solids; and combining, by the computer aided design program, the one or more modified smooth surfaces with the one or more input solids to form a second three-dimensional model of the object to be manufactured, wherein the second three-dimensional model includes the one or more modified smooth surfaces in contact with one or more portions of the one or more input solids in the boundary representation format at one or more gap-free contact curves, wherein the second three-dimensional model is watertight, and wherein each of the one or more gap-free contact curves and each of the one or more modified smooth surfaces is editable using free-form modeling operations.

The one or more editable smooth surfaces are globally smooth in that their surface parameterization is smooth for the entirety of the surface. This is in contrast with being piece-wise smooth (often referred to as simply being smooth) which means that there are discontinuities in the surface parameterization, which can cause normal or curvature shape discontinuities. It will be appreciated that globally smooth surfaces are preferable for end users, as they allow simpler and more natural edits where smoothness remains unbroken as the user performs the edits. Thus, the method's ability to construct globally smooth surfaces for the second portion of the polygon mesh provides significant value in a computer aided design application. Moreover, the one or more constructed surfaces can be tightly fitted to the second portion of the mesh in that the globally smooth surface deviates from the mesh no further than an approximation tolerance specified by the application, and the ability of the method to satisfy this constraint can also be of significant value in a computer aided design application.

Further, watertight and editable character of the second three-dimensional model likewise provides significant value. Being watertight means there are no gaps where the modified and globally smooth surfaces are in contact with the input solids. Ensuring that the contact curves between the constructed (and modified) surfaces and the input solids are gap-free in the boundary representation format means that the input solids, the surfaces generated from the mesh of the generative design, and the contacts there between are all further editable using standard computer aided design and free-form modeling operations. This facilitates the use of the method with existing workflows employed by typical users of computer aided design applications.

This process of converting generative designs to watertight B-Rep models composed of the exact residual geometry of the input solids and editable (e.g., T-NURCC) surfaces avoids the need for a manual conversion process that relies on the skills of a user. The process achieves this while being able to handle any suitable number of keep-in and keep-out solids as generative design geometry constraints. Moreover, the produced watertight 3D models allow the generative designs to be readily used in downstream workflows (e.g., setting up assembly constraints, simulation analyses, performing parametric edits, etc.) which can accelerate the path to manufacturing and can reduce the product time to market. Thus, the disclosed systems and techniques enable engineers to rapidly obtain useful CAD models of any number of generative designs computed by a variety of algorithms, settings and iterations.

The generative design process can employ a volumetric (e.g., tetrahedral or hexahedral) mesh method, a level set method, or an unknown or proprietary method to create the generative design for the object (provided a distance representing the accuracy of the method is known). The polygon mesh can be a triangle mesh, either originally or by conversion thereto, coinciding with a boundary of the generative design. The partitioning can include assigning triangles to the first portion based on incidence data determined in accordance with generative design information associated with an accuracy of the generative design process. For example, for a generative design process that employs a level set method, the generative design information used can be grid cell containment information, and the method can check for input solids that intersect the grid cell. In general, the partitioning can include assigning triangles to the first portion based on incidence data determined for the vertices of the triangles, wherein some vertices are determined as incident with one or more input solids, based on a computation specific to the generative design process and the input solid type. Further, a triangle can be assigned to the second portion when the triangle has at least one vertex that is not determined as being incident with an input solid.

Each vertex of the polygon mesh can be assigned as incident to one or more solids based on processing a level set representation (when a level set method is used for the generative design process) or based on sampling (e.g., at the beginning of the generative design process, each vertex on the boundary of the volumetric mesh can be assigned as incident to one or more input solids whose surface is sampled to compute the vertex position). Further, the generative design information can be distance information, and the assigning can include assigning triangles to the first portion based on a threshold distance between vertices of the triangles and the one or more input solids, wherein a vertex of a triangle is treated as being incident with an input solid when the vertex is contained by or within the threshold distance of a surface of the input solid, and the threshold distance corresponds to a discretization accuracy of the triangle mesh's representation of the generative design created by the generative design process, even when the details of how the generative design process operates are unknown, but the accuracy of the generative design process is known. Thus, each vertex can be assigned as incident to one or more solids which contain the vertex within a distance threshold from their boundary, wherein the distance threshold is equal to the known accuracy of the generative design process.

The partitioning can include: checking for any non-manifold boundary vertices that (i) lie on a boundary between the first portion and the second portion and (ii) connect more than two boundary edges that lie on the boundary between the first portion and the second portion; reassigning one or more incident triangles, which include such non-manifold boundary vertices, from the first portion to the second portion; and iteratively repeating the checking and the reassigning until no non-manifold boundary vertices remain. Further, the partitioning can include relaxing a boundary shape formed by boundary edges that lie on a boundary between the first portion and the second portion by at least in part shifting boundary vertex positions towards their averages to decrease angular and length deviations on the boundary shape.

The one or more editable smooth surfaces can be one or more T-Spline surfaces, and the constructing can include: adding regularity constraints on any boundary vertices with a flat interior surface angle; applying boundary curve tangent direction propagation along boundary edges that lie on a boundary between the first portion and the second portion; applying a globally continuous map computation method, aligned with principal curvatures in anisotropic regions, scaled according to local curvatures, quantized to obtain a quad partitioning of the map image; applying a global map relaxation to improve smoothness of the global quad partitioning; and applying a global T-Spline surface approximation method that contains an approximation error of the second portion of the mesh. Applying the global T-Spline surface approximation method can involve, in particular, containing the approximation error of the second portion of the mesh at a boundary between the two portions of the mesh, within an approximation tolerance specified by the application.

The modifying can include: pulling at least one boundary of the one or more editable smooth surfaces toward at least one of the one or more input solids (including pulling the boundary inside the space contained by the input solid) by applying a gradient descent method for a distance function for the input solid evaluated for the pulled boundary; setting a safety tolerance value for the modifying based on accuracy limitations of (i) an intersection algorithm employed by the modifying and/or (ii) the triangle mesh's representation of the generative design created by the generative design process; and iteratively adjusting the safety tolerance value to ensure the one or more contact curves of the one or more modified smooth surfaces with the one or more input solids are homeomorphic to the unmodified boundary. The combining can include using Boolean operations that function on solids and oriented sheets or using cellular modelling techniques.

The computer aided design program can include two or more programs that operate cooperatively on two or more separate computer processors. The method can further include providing, by the computer aided design program, the second three-dimensional model for use in manufacturing a physical structure corresponding to the object using one or more computer-controlled manufacturing systems. The providing can include saving the second three-dimensional model to a permanent storage device for use in manufacturing the physical structure corresponding to the object using the one or more computer-controlled manufacturing systems. The one or more computer-controlled manufacturing systems can include an additive manufacturing machine, and the providing can include: generating toolpath specifications for the additive manufacturing machine using the second three-dimensional model; and manufacturing at least a portion of the physical structure corresponding to the object with the additive manufacturing machine using the toolpath specifications generated for the additive manufacturing machine.

One or more other aspects of the subject matter described in this specification can be embodied in one or more systems that include: a non-transitory storage medium having instructions of a computer aided design program stored thereon; and one or more data processing apparatus able to run the instructions of the computer aided design program to perform any of the methods. The system(s) can include an additive manufacturing machine, wherein the one or more data processing apparatus are able to run the instructions of the computer aided design program to generate toolpath specifications for the additive manufacturing machine from the second three-dimensional model, and manufacture at least a portion of the physical structure corresponding to the object with the additive manufacturing machine using the toolpath specifications. Moreover, one or more aspects of the subject matter described in this specification can be embodied in one or more non-transitory computer-readable media encoding a computer aided design program operable to cause one or more data processing apparatus to perform any of the methods.

Particular embodiments of the subject matter described in this specification can be implemented to realize one or more of the following advantages. Rather than using a specialized solver that processes input solid B-Reps directly and outputs restricted type of B-Rep geometry (e.g., lattice structures) instead of a mesh, more versatile generative design solvers that produce mesh outputs can be used, which provides the ability to generate more varied and useful shapes that optimize for arbitrary physical criteria. Further, violations of keep-in and keep-out constraints, which often result from unrestricted global approximation schemes for converting a generative design mesh into a globally smooth subdivision or spline surface, can be avoided, along with any need to repair such violations with separately applied Boolean operations, the application of which to resolve such issues is unreliable and results in poor quality outcomes. Thus, new and unique geometry for a generative design can be produced to meet a wide variety of design requirements, without user input or editing being necessary, where the new geometry connects smoothly with the input geometry provided to the generative design process.

Using the systems and techniques described herein to convert a generative design mesh into an editable, watertight B-Rep can facilitate downstream editing and processing of the generatively designed 3D model (e.g., fillet or shell operations) where such downstream editing and processing often requires precise mathematical geometry and cannot work effectively with generative design meshes that have been embedded with a B-Rep. Moreover, the conversion process can be fully automatic in that manual efforts are not required to align smooth surfaces of the input solids to the processed mesh geometry to produce geometry results that accurately represent the residual input solid surfaces in the generative design, even for complex, feature-rich shapes, which are often present in generative designs. This saves time in the design process, which facilitates the use of generative design techniques by reducing the costs of creating final, manufacturable designs.

The details of one or more embodiments of the subject matter described in this specification are set forth in the accompanying drawings and the description below. Other features, aspects, and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

1—Overview

The fully automatic method of the present disclosure can take as input the generative solver input solid B-Reps (called "input solids" or represented as $\{S_i\}$) and the output mesh ($\mathbb{M}$) representing the generative design ($\mathbb{G}$). To link $\mathbb{M}$ to $\{S_i\}$, the intermediate solver representation (e.g., level set or volumetric mesh) can also be processed. Alternatively, the solver representation accuracy error (e.g., the level set voxel grid edge length) can be supplied instead.

$\{S_i\}$ designates sub-spaces of the optimization domain. $\partial S_i$ denotes the solid boundary surface, and $S_i^o$ denotes the solid boundary interior. $\{S_i\}$ can be of the following types: keep-in ($S_i$ is completely contained by the generative design, i.e., $S_i \subset \mathbb{G}$), keep-out ($S_i^o$ is outside of the generative design, $\mathbb{G}$; $\partial S_i$ can overlap), or seed ($S_i$ is fully or partially inside the generative design, $\mathbb{G}$).

Overlapping input solids of the same type are united, so without loss of generality, $S_i \cap S_j = \emptyset$ for every i,j of the same type. The union of all input solids (i.e., regardless of type) is denoted as $\mathbb{S} = \cup S_i$. $\mathbb{M} = \{\mathbb{V}, \mathbb{E}, \mathbb{T}\}$ is a closed 2-manifold mesh approximating $\mathbb{G}$, where $\mathbb{V} = \{V_i\}$, $\mathbb{E} = \{E_i\}$, $\mathbb{T} = \{T_i\}$ are the mesh vertices, edges and triangles, respectively. If a non-triangular mesh is provided, quads and general polygons can be triangulated to form a triangular mesh.

Some embodiments of the fully automatic method of the present disclosure works as follows: (1) partition the generative design mesh into two subsets (regions): incident and organic, where the incident subset (region) corresponds to the input solid surfaces, and the organic subset (region) corresponds to the generative synthesis surface; (2) approximate the organic subset (region) with globally smooth and tightly fitting, editable "organic" surfaces; and (3) compose a watertight B-Rep by combining the input and organic surfaces.

Figure 4:
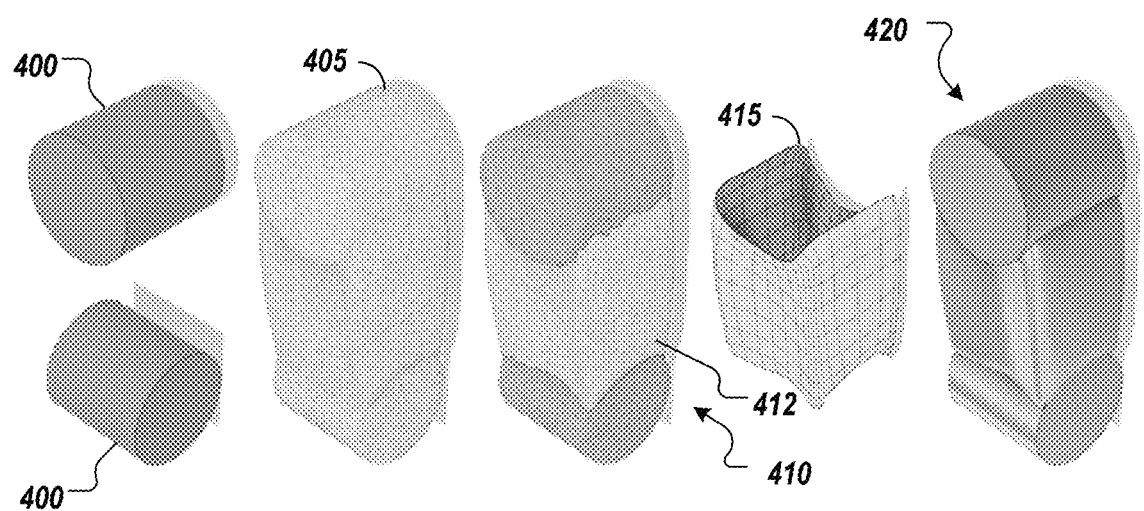
FIG. 4 shows an overview example of a simple generative model that results in a final generative B-Rep.

FIG. 4 shows an overview example of a simple generative model that results in a final generative B-Rep. Input solids 400 and an input generative mesh 405 are received, and the input generative mesh 405 is partitioned into a mesh partitioning 410. This can involve building and incidence relation $\mathbb{I}$ from $\mathbb{M}$ to the input B-Reps $\{S_i\}$, and using $\mathbb{I}$ to determine the elements of $\mathbb{M}$ corresponding to each $S_i$. One or more organic T-Spline surface(s) 415 (or another surface type in a suitable editable/locally refinable smooth surface format, e.g., T-NURCC) are generated for the organic part 412 of the mesh partitioning 410. This can involve approximating the organic region 412 of the partitioned mesh 410 by relaxing the boundary between the organic and incident regions, computing cross, size and field-guided quad parameterization of the organic region, and constructing the smooth surfaces $\{O_i\}$ approximating the organic region 412. A final generative B-Rep model 420 is composed from the constructed, organic smooth surface(s) 415 and the input solids 400. This can involve pulling the boundaries of $\{O_i\}$ in the interior of $\mathbb{S}$, constructing contact curves between $\{O_i\}$ and $\{S_i\}$, and composing a watertight B-Rep from $\{O_i\}$ and $\{S_i\}$.

2—Mesh Partition

The output mesh $\mathbb{M}$ from the generative design solver is partitioned into a pair of disjoint triangle subsets $\mathbb{T} = \mathbb{C} \cup \mathbb{O}$, where $\mathbb{C}$ represents the input solid B-Reps in $\mathbb{M}$, and $\mathbb{O}$ represents the boundary surface of the "organic" material synthesized by the solver. Note that $\uplus$ denotes the union of disjoint sets. To compute this partition, an incidence relation ($\mathbb{I} : \mathbb{M} \to \mathcal{P}(\{S_i\})$) is built using the solver geometry representation, where $\mathcal{P}(\{S_i\})$ is the power set of $\{S_i\}$, and $\mathbb{I}$ can map a mesh to zero, one or multiple input solids.

2.1—Incidence Data

Incidence data ("incidences") is constructed linking the generative mesh to the input solids. The incidences are stored as one or more attributes per each mesh vertex considered a representative of an input solid surface. A vertex can be incident with multiple input solids.

Notably, it is not required that a representative vertex lie precisely on the incident input surface(s). The method of the present disclosure performs robustly when the vertex positions are displaced within the generative solver B-Rep discretization accuracy (e.g., level set grid edge size).

The incidence data construction varies on how the solver represents the input solids internally. Incidence extraction methods are proposed for two common solver representations: level set and volumetric mesh. In addition, a fallback distance-based algorithm is described, which can be applied to any generative output mesh if an incidence distance is provided.

2.1.1—Level Set Incidences

Level sets are one of the most popular contemporary representations for generative design, used both in research work (Van Dijk, N. P., Maute, K., Langelaar, M., and Van Keulen, F., Level-set methods for structural topology optimization: a review, Structural and Multidisciplinary Optimization 48, 3, 437-472, 2013) and in the CAD industry (Autodesk Dreamcatcher, Project Dreamcatcher, Autodesk Research, https://autodeskresearch.com/projects/dreamcatcher). The solver output $\mathbb{M}$ is extracted by approximating the 0-isosurface $\partial \overline{\mathbb{G}}$ using a contouring algorithm (such as in Lorensen, W. E. and Cline, H. E., Marching Cubes: a High Resolution 3D Surface Construction Algorithm, Proc. of ACM SIGGRAPH 87, 163-170, 1987; Kobbelt, L., Botsch, M., Schwanecke, U., and Seidel, H.-P., Feature Sensitive Surface Extraction from Volume Data. Proc. of ACM SIGGRAPH 01, 57-66, 2001; Ju, T., Lassasso, F., Schaefer, S., and Warren, J., Dual Contouring of Hermite Data, Proc. of ACM SIGGRAPH 02, 339-346, 2002) where $\overline{\mathbb{G}}$ is the level set representation of the generative design. Each mesh vertex position is computed by combining the corner positions of the level set grid cell containing the vertex.

Mesh vertex incidences are constructed as the union of the grid cell corner incidences as follows: (1) construct the incidence set $\mathbb{I}(g_k) = \{S_i | g_k \in S_i\}$ for each grid point $g_k$. The "point in solid" test uses the standard ray-surface intersection count algorithm (Chen, M. and Townsend, T., Efficient and Consistent Algorithms for Determining the Containment of Points in Polygons and Polyhedra, EG 1987-Technical Papers, Eurographics Association, 1987). For efficiency, only grid points participating in the mesh extraction need be tested (i.e., the corner points of the narrow band of cells intersecting $\partial \overline{\mathbb{G}}$; (2) if $g_k \notin \overline{\mathbb{G}} \wedge \mathbb{I}(g_k) = \{S_i\}$ for a seed $S_i$, the volume around $g_k$ has been eroded from $\overline{\mathbb{G}}$, then set $\mathbb{I}(g_k) = \{\varepsilon_i\}$, where $\varepsilon_i \subseteq S_i$ is the "eroded" subset of $S_i$; and (3) for each $V_i$ extracted in a grid cell $G_j$ with corners $\{g_{j,k}\}_{k=0}^7$, construct the incidence set $\mathbb{I}(V_i) = \cup_{k=0}^7 \mathbb{I}(g_{i,k})$ by uniting the incidences of the cell corners.

Figure 5A:
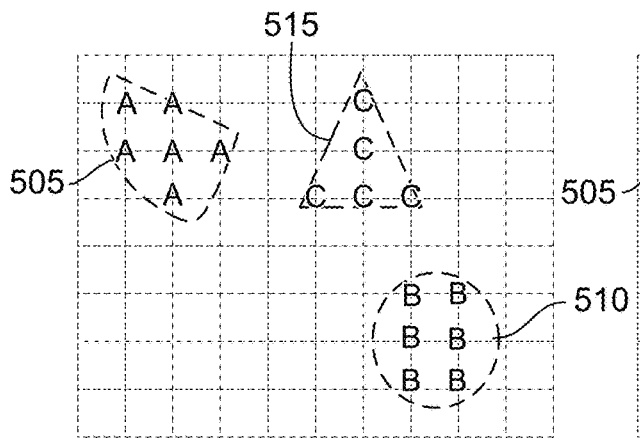
FIGS. 5A, 5B and 5C show an overview example of 2D level set incidences from a keep-in solid, a keep-out solid, and a seed solid.
Figure 5B:
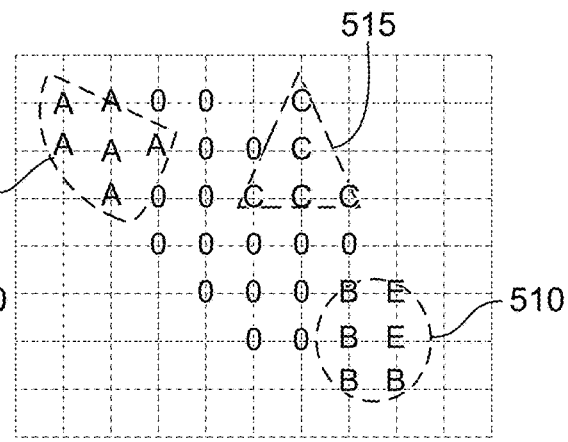
Figure 5C:
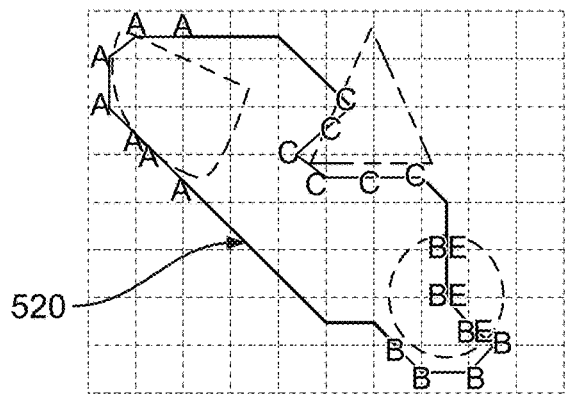

FIGS. 5A, 5B and 5C show an overview example of 2D level set incidences from three input solids $\{A, B, C\}$: a keep-in solid 505 (represented using a dashed line), a seed solid 510 (represented using a dash-dot line), and a keep-out solid 515 (represented using a dash-dot-dot line). Incidence attributes are assigned to grid points on or inside a solid as shown in FIG. 5A. Organic material (O) is added and seed solid material (E) is subtracted by the solver as shown on the grid points in FIG. 5B (the grid is represented using dotted lines). Grid vertex attributes are propagated to mesh vertices extracted from each grid cell at 520 in FIG. 5C (the solid lines represent the boundary of the solver output, where the thicker solid lines correspond to the added organic material). Note that vertices extracted from purely additive organic cells do not have incidence attributes.

2.1.2—Volumetric Mesh Incidences

Volumetric meshes (e.g., tetrahedral and hexahedral meshes) are another commonly used generative design representation, especially popular in topology optimization applications (Brackett, D., Ashcroft, I., and Hague, R., Topology optimization for additive manufacturing, Proceedings of the solid freeform fabrication symposium, Austin, TX, 348-362, 2011; Chen, X., Peng, D., and Gao, S., SVM-Based Topological Optimization of Tetrahedral Meshes, Proceedings of the 21st International Meshing Roundtable, Springer Berlin Heidelberg, Berlin, Heidelberg, 211-224, 2013). Incidence data extraction from the volumetric mesh $\overline{\mathbb{G}}$ is straightforward since $\mathbb{M} = \partial \overline{\mathbb{G}}$. Let $\mathbb{K} \subseteq \mathbb{S}$ be the union of the input keep-in solids and seed solids. $\overline{\mathbb{G}}$ is initialized by piecewise-linear sampling of $\mathbb{K}$, (i.e., $\overline{\mathbb{G}} \cong \mathbb{K}$). Hence, initially $\mathbb{M} \cong \partial \mathbb{K}$. During initialization, set $\forall V_i \in \mathbb{V}$ the incidence attribute $\mathbb{I}(V_i) = \{S_j\}$, where $\partial S_j, S_j \subseteq \mathbb{K}$ is the input solid boundary sampled to obtain the position of $V_i$. The attributes persist during the generative optimization of $\overline{\mathbb{G}}$ and are recovered from the final $\mathbb{M} = \partial \overline{\mathbb{G}}$ for all vertices that have not been either eroded or added by the solver.

2.1.3—Distance Incidences

The generative design provided may not be based on volumetric optimization, or the internal geometry representation may be unavailable or proprietary. In such cases, incidence data can be constructed given a distance $d > 0$ representing the accuracy tolerance of the underlying solver representation.

In such cases, the incidence data is constructed as follows: $\forall V_i \in \mathbb{V}$ and $\forall S_j$, compute $D_j(V_i)$ where $D_j()$ is the signed distance function of $\partial S_j$, $D_j(p) \leq 0$ for $p \in S_j$. Next, set $\mathbb{I}(V_i) = \{S_j | D_j(V_i) \leq d\}$ (i.e., the subset of input solids that contain $V_i$ within d of their surface). If $\mathbb{I}(V_i) = \{S_j\} \wedge D_j(V_i) < -d$ for a seed $S_j$, set $\mathbb{I}(V_i) = \{S_j, \varepsilon_i\}$ or $\emptyset$. For large $|\mathbb{V}|$ and $|\{S_i\}|$, a bounding hierarchy of $\mathbb{S}$ for proximity searches can be precomputed to improve efficiency (Ehmann, S. A. and Lin, M. C., Accurate and Fast Proximity Queries Between Polyhedra Using Convex Surface Decomposition, Computer Graphics Forum 20, 3, 2001; Alliez, P., Tayeb, S., and Wormser, 2018, 3D Fast Intersection and Distance Computation, CGAL User and Reference Manual, CGAL Editorial Board. 2018; Siemens, Collision Detection Manager (D-Cubed CDM)—Siemens PLM Software, https://www.plm.automation.siemens.com/en/products/open/d-cubed/cdm/index.shtml).

2.2—Partitioning

Incidence data is extended to the mesh triangles as follows: if all three vertices of a triangle $T_i = \{V_i, V_j, V_k\}$ are incident with some solid(s), construct the triangle incidence $\mathbb{I}(T_i) = \mathbb{I}(V_i) \cup \mathbb{I}(V_j) \cup \mathbb{I}(V_k)$. Otherwise, set $\mathbb{I}(T_i) = \emptyset$. Notably, if a triangle has at least one vertex that is organic, the entire triangle is considered organic, even if another vertex is incident with a solid.

Figure 1:
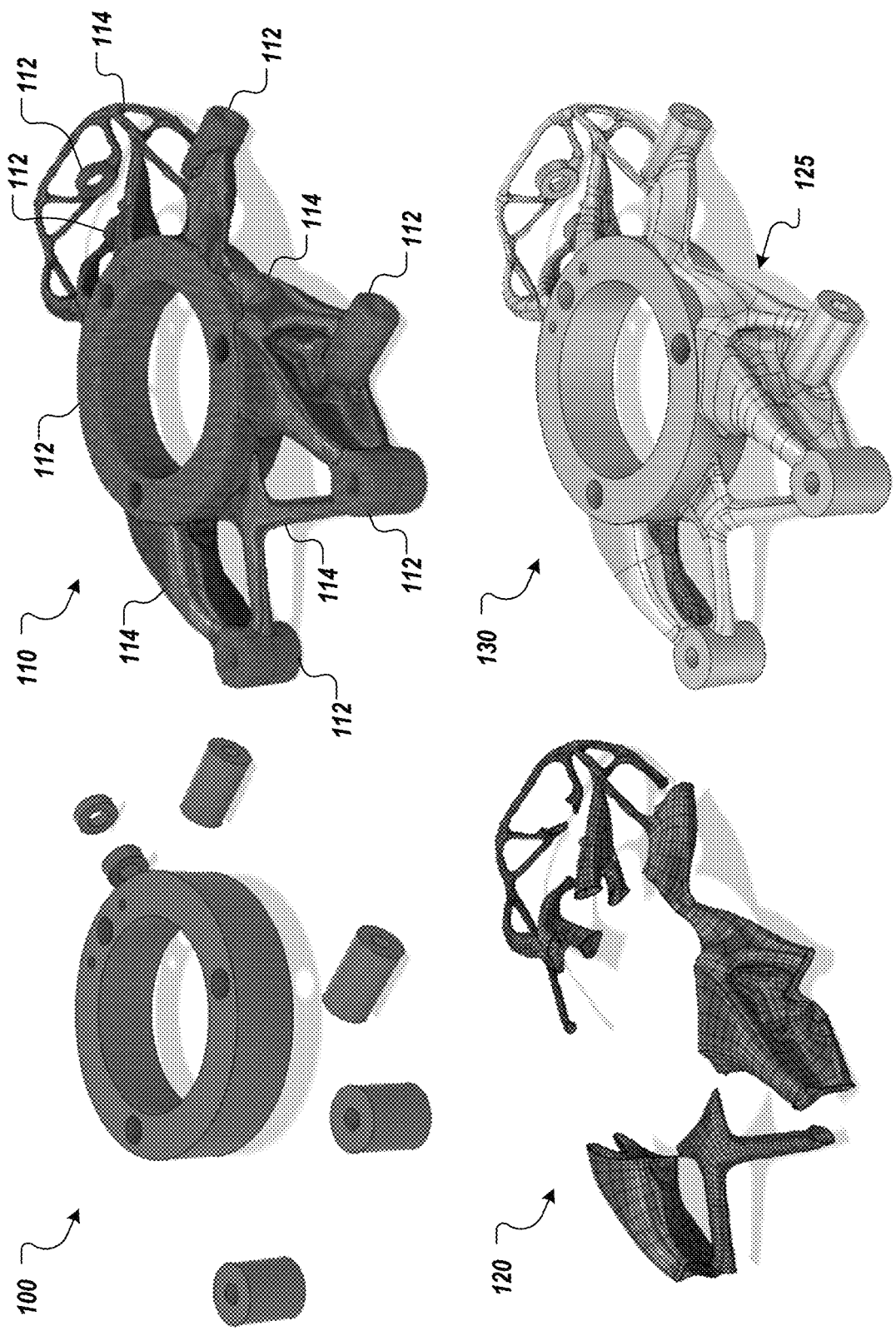
FIG. 1 shows an overview example of a generative design process that results in an editable, watertight B-Rep.
Figure 2:
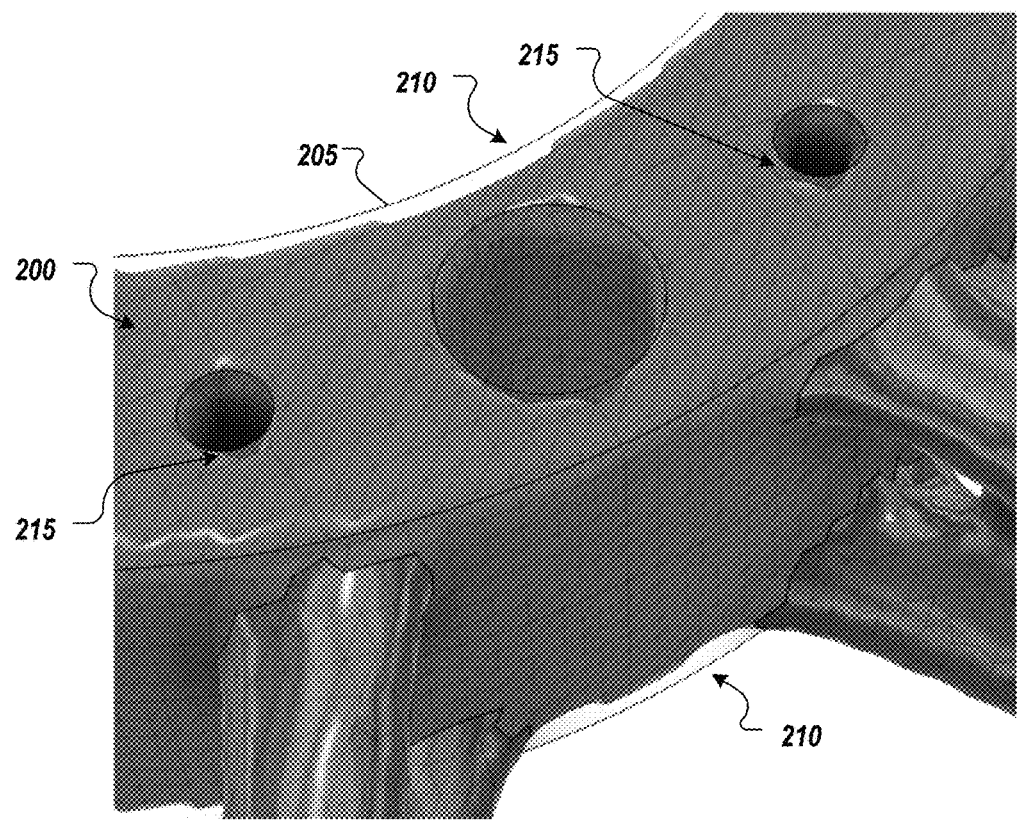
FIG. 2 shows an example of how generative design solvers introduce a loss of surface precision due to the limitations of the target representation.
Figure 3:
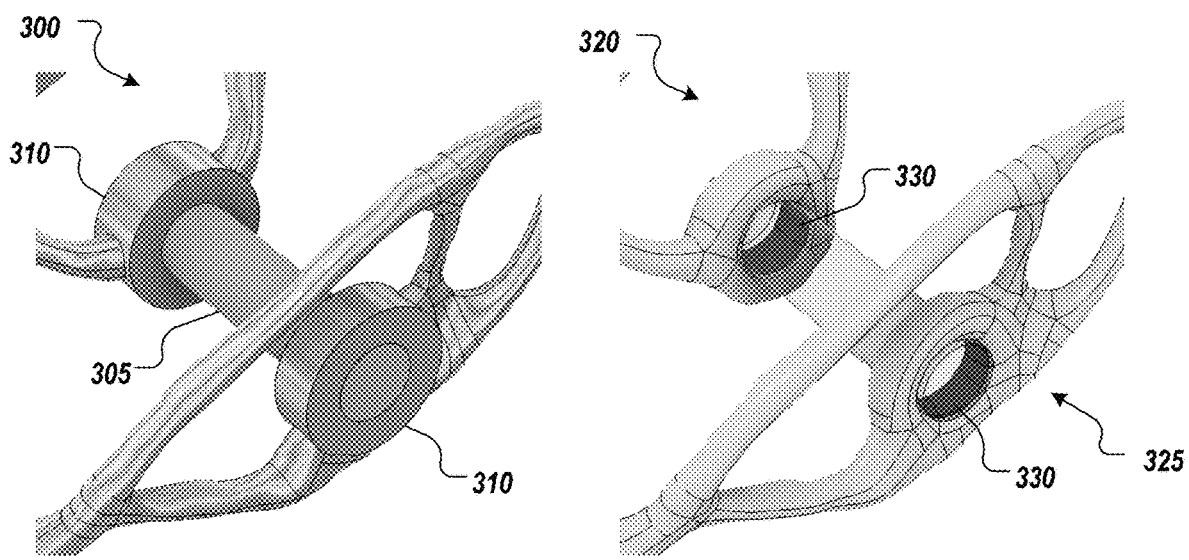
FIG. 3 shows another example of such loss of surface precision and how this can cause part interferences.
Figure 6:
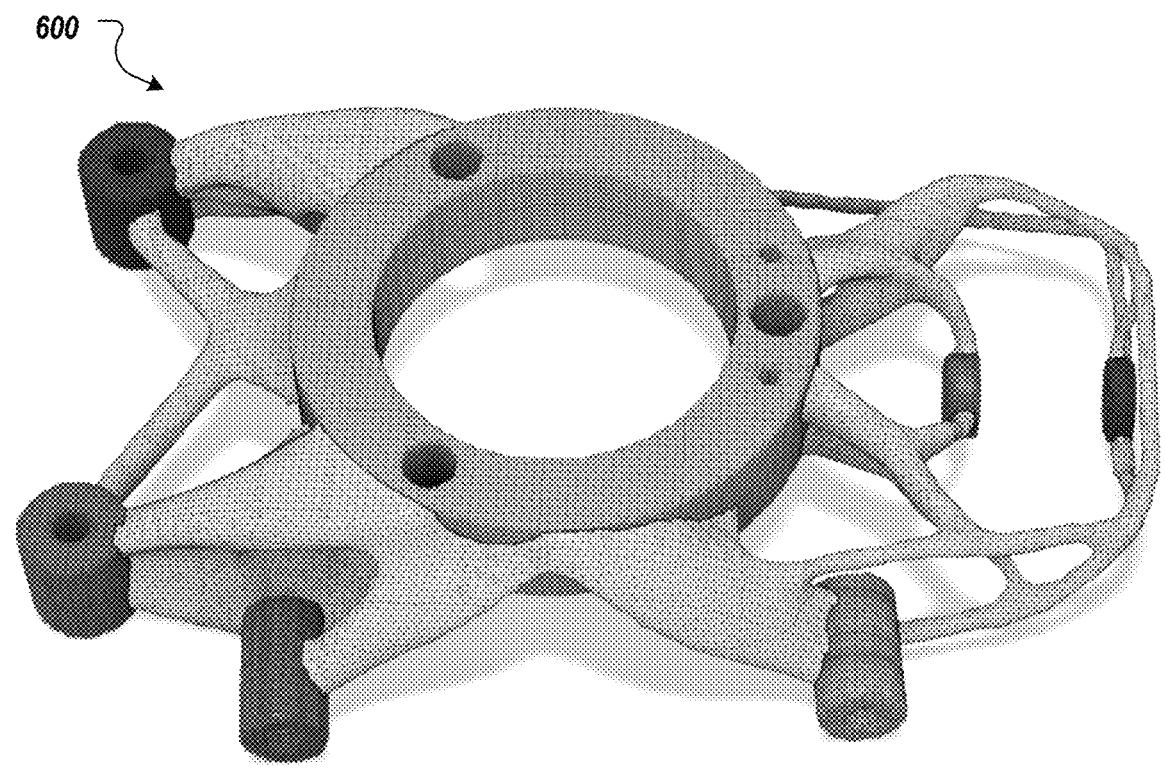
FIG. 6 shows an example of mesh subsets constructed for the input solids of FIG. 1.

From the triangle incidences, mesh subsets are constructed corresponding to each input solid $S_i \leftrightarrow \mathbb{C}_i = \{T_i | T_i \in \mathbb{T} \wedge S_i \in \mathbb{I}(T_i)\}$. FIG. 6 shows an example of mesh subsets 600 constructed for the input solids 100 of FIG. 1. Notably, $\mathbb{C}_i \cap \mathbb{C}_j \neq \emptyset$ if $\partial S_i \cap \partial S_j \neq \emptyset$, and $\mathbb{C}_i = \emptyset$ if $S_i$ is consumed by organic material. Next, the incident $\mathbb{C} = \cup \mathbb{C}_i$ and organic $\mathbb{O} = \mathbb{T} \setminus \mathbb{C}$ parts are constructed to complete the partition $\mathbb{T} = \mathbb{C} \uplus \mathbb{O}$

2.3—Organic Components

A pair of triangles $T_i$ and $T_j$ are edge-connected if they share an edge $E_k = T_i \cap T_j$. The elements $\{\mathbb{O}_i\}$ of the smallest partition $\uplus \mathbb{O}_i = \mathbb{O}$ are referred to in disjoint, edge-path-connected subsets as the organic components of $\mathbb{O}$. This partition is trivially computed by "flood-fill" through edge connections.

3—Organic Boundary $\mathbb{B} = \{E_i | E_i = T_j \cup T_k \wedge [(T_j \in \mathbb{C} \wedge T_k \in \mathbb{O}) \vee (T_j \in \mathbb{O} \wedge T_k \in \mathbb{C})]\} \subset \mathbb{E}$ is the subset of edges separating $\mathbb{O}$ and $\mathbb{C}$. Thus, $\mathbb{B}$ is referred to as the organic boundary, and its elements are referred to as the organic boundary edges, or just boundary edges: this short-hand notation is not ambiguous since $\mathbb{M}$ is closed by definition.

3.1—Boundary Vertices

Two edges $E_i$ and $E_j$ are connected if they share a vertex $V_k = E_i \cap E_j$. $V_k$ is referred to as boundary if $E_i \in \mathbb{B} \wedge E_j \in \mathbb{B}$. Most boundary vertices connect a single pair of boundary edges and are known as 2-manifold. However, occasionally there exist partitions where a vertex $V_k$ is connecting multiple pairs of boundary edges (i.e., $V_k$ is a non-manifold boundary vertex). Such vertices introduce complications in downstream processing that should be resolved by special case handling.

Figure 7:
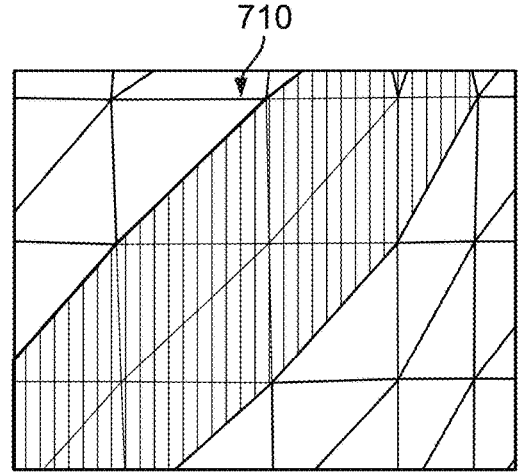
FIG. 7 shows an example of how a non-manifold boundary vertex is eliminated.

FIG. 7 shows an example of how a non-manifold boundary vertex 705 is eliminated; the configuration is repaired by slightly altering the partition to result in only manifold vertices 710. For all non-manifold vertices $\{V_k\}$, reassign all incident triangles $\{T_j | T_j \cap \{V_k\} \neq \emptyset \wedge T_j \in \mathbb{C}\}$ to $\mathbb{O}$. $\{V_k\}$ are no longer boundary, but now the organic component partition $\uplus \mathbb{O}_i = \mathbb{O}$ should be recomputed, since the reassigned triangles introduce new edge connections in $\mathbb{O}$ which may connect previously disconnected subsets. This process can be iterated until all boundary vertices become 2-manifold. Often, only a few iterations are needed to complete the process. In addition, convergence is ensured for pathological input data as well, since the entire mesh is eventually reassigned to the organic region.

3.2—Boundary Curves

Considering the elements $\{\mathbb{B}_i\}$ of the smallest organic boundary partition $\uplus \mathbb{B}_i = \mathbb{B}$ in path-connected, disjoint subsets, to compute $\{\mathbb{B}_i\}$, trace the vertex connections using an arbitrary unprocessed boundary edge as a seed. The algorithm completes the current subset $\mathbb{B}_i$ when closing the traced edge sequence. This construction shows that $\{\mathbb{B}_i\}$ represent closed, piecewise-linear curves, and are referred to as the boundary curves of the partition $\mathbb{T} = \mathbb{C} \uplus \mathbb{O}$.

3.3 Boundary Relaxation

Next, as a precondition to further processing, the shape of the boundary curves $\{\mathbb{B}_i\}$ can be relaxed to reduce jaggedness and length difference between adjacent boundary edges. This step is important for obtaining high quality, simpler quad-maps, which in turn lead to improved editability of the output organic surfaces.

The unrestricted version of piece-wise linear relaxation is well known as curve smoothing (Chaikin, G. M., An algorithm for high speed curve generation, Computer Graphics and Image Processing 20, 3, 346-349, 1974; Taubin, G., A signal processing approach to fair surface design, Proc. of ACM SIGGRAPH 95, 351-358, 1995). However, to avoid the shape shrinkage caused by such algorithms, curve relaxation is restricted to the surface of $\mathbb{M}$ and works as follows, summarized as (1) remeshing and (2) smoothing:

(1) Adaptively remesh a small channel of triangles around $\mathbb{B}$ to reduce adjacent boundary edge length differences. The channel can include all triangles that are in the two-ring neighbourhood of the boundary vertices, but alternative definitions are also applicable. Remesh by applying the curvature-adaptive algorithm (e.g., as described in Alliez, P., Ucelli, G., Gotsman, C., and Attene, M., Recent Advances in Remeshing of Surfaces, 2005) and refine the adjacent mesh triangles to conform to the changes.

(2) Smooth $\mathbb{B}$ by applying the surface-restricted curve smoothing algorithm (e.g., as described in U.S. Publication No. 2013/0300735), which iteratively decreases angular and length deviations on the boundary curve by shifting the boundary vertex positions towards their averages.

Note that the step of remeshing is not strictly required, but it can lead to much better relaxation outcomes, mostly because the improved mesh sampling reduces significantly the adjacent boundary edge length differences.

Figure 8:
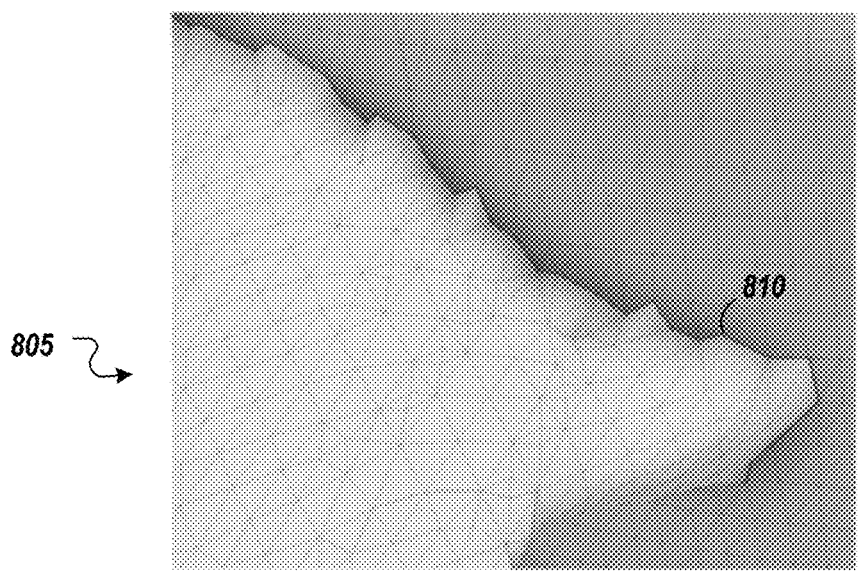
FIG. 8 shows an example of boundary relaxation leading to high-quality contact geometry between the organic surfaces and an input solid.
Figure 8:
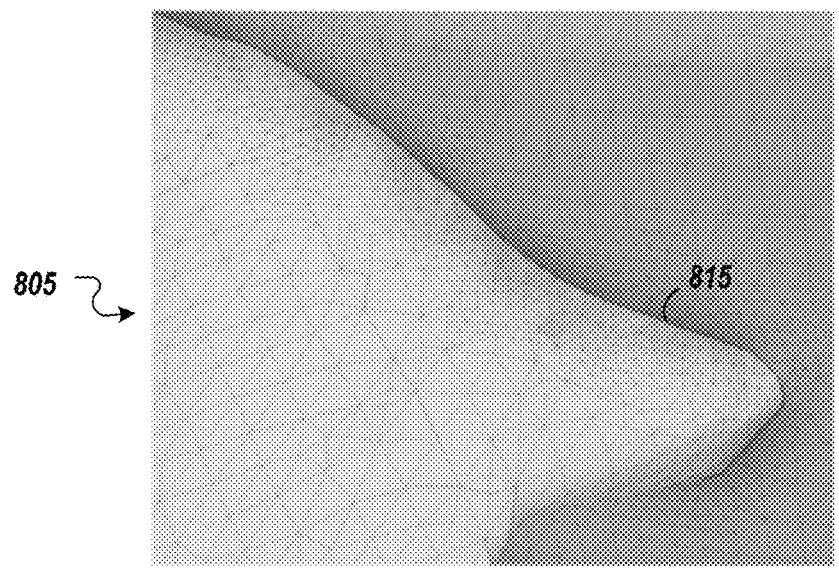
Figure 8:
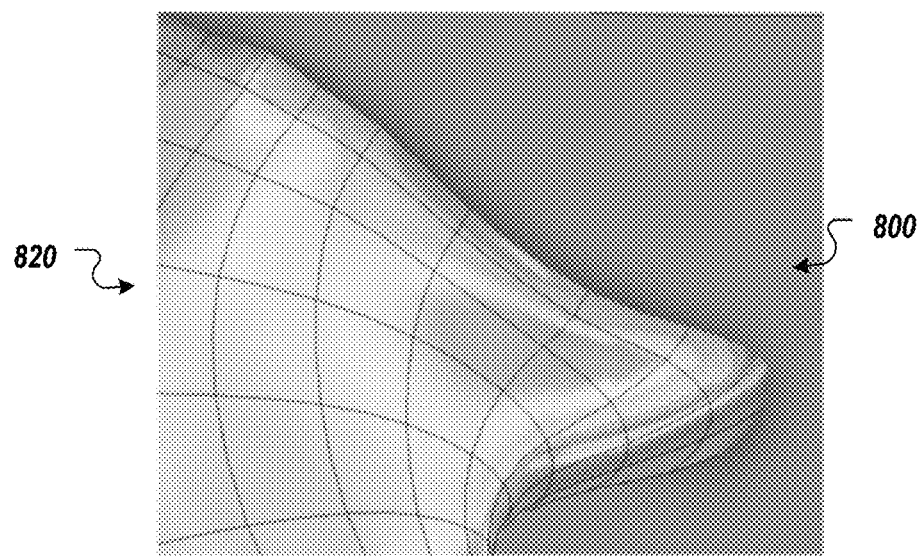

FIG. 8 shows an example of boundary relaxation leading to high-quality contact geometry between the organic surfaces and an input solid. The input mesh 805 before relaxation has a high-curvature organic boundary segment 810. The high-curvature organic boundary segment after relaxation 815 has a reduced adjacent boundary edge length difference. Lastly, the input solid 800 is shown with an organic surface 820 (e.g., a T-Spline surface) constructed for the relaxed input mesh 805.

4—Organic Surfaces

Next, a construction is presented of a set of editable smooth surfaces $\{O_i\}$, one per organic component $\{\mathbb{O}_i | \uplus \mathbb{O}_i = \mathbb{O}\}$. As the fully automatic method of the disclosed subject matter applies identically for each component $\mathbb{O}_i \rightarrow O_i$, the component index i is omitted to simplify the notation.

The editable surface representation used can be T-Splines and/or T-NURCCs (Sederberg, T. W., Zheng, J., Bakenov, A., and Nasri, A., T-splines and T-NURCCs, Proc. of ACM SIGGRAPH 03, 477-484, 2003). T-Splines provide a map atlas of $C^2$ continuous quad patches $\{Q_i\}$ covering the represented shape and a conforming quad control mesh $\mathbb{Q}$ fully defining the surface geometry. The map atlas is useful to apply general CAD algorithms such as surface-surface intersections, while quad control meshes are one of the most popular tools for organic shape editing employed by industry designers.

T-Splines are capable of local T-junction insertion without reparameterization (Sederberg, T. W., Cardon, D. L., Finnigan, G. T., North, N. S., Zheng, J., and Lyche, T., T-spline simplification and local refinement, Proc. of ACM SIGGRAPH 04, 276-283, 2004). Hence, the deviation from $\uplus \mathbb{Q}$ can be efficiently reduced by adding further degrees of freedom only where needed (Li, W.-C., Ray, N., and Levy, B., Automatic and Interactive Mesh to T-Spline Conversion, Proc. of the Symposium on Geometry Processing, 191-200, 2006). For applications where T-Splines are undesirable, the output surface can be converted to a $G^1/G^2$ continuous non-uniform rational basis spline (NURBS) network using per-patch approximation, or a $C^2$ Catmull-Clark subdivision surface (Catmull, E. and Clark, J., Recursively generated B-spline surfaces on arbitrary topological meshes, Computer Aided Design 10, 6, 350-355, 1978) by extending all T-joints.

T-NURCCs can also be used and provide the following useful properties: (1) the surface is defined by a quad control mesh, a very popular tool for shape editing employed by industry designers; (2) local refinement (Sederberg, T. W., Cardon, D. L., Finnigan, G. T., North, N. S., Zheng, J., and Lyche, T., T-spline simplification and local refinement, Proc. of ACM SIGGRAPH 04, 276-283, 2004) allows for error reduction by adding control points only where needed (Li, W.-C., Ray, N., and Levy, B., Automatic and Interactive Mesh to T-Spline Conversion, Proc. of the Symposium on Geometry Processing, 191-200, 2006; Wang, Y. and Zheng, J., Adaptive T-spline surface approximation of triangular meshes, 6th International Conference on Information, Communications and Signal Processing, ICICS, IEEE, 1-5, 2007); (3) general CAD algorithms (e.g., intersection, offset) can access the geometry as an atlas of $C^2$ continuous quad patches; and (4) the surface can be readily converted to a $G^1$ continuous NURBS network for export to legacy CAD formats.

Figure 9:
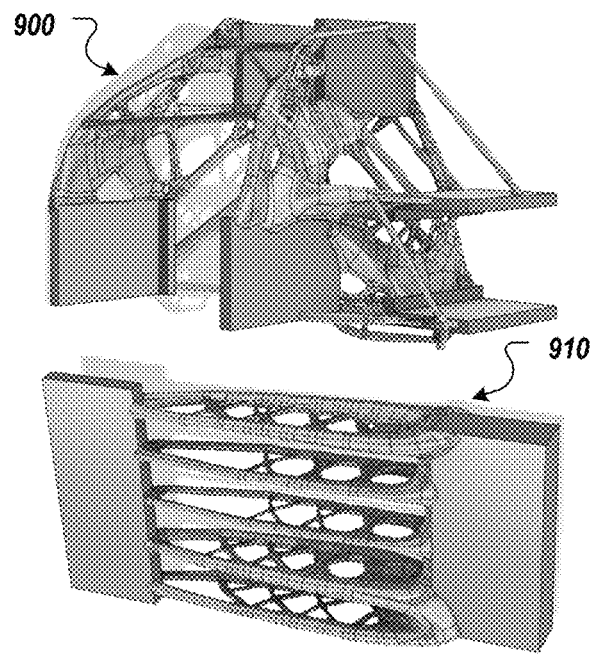
FIG. 9 shows examples of a high genus (88 and 54) generative design B-Reps generated using the fully automatic method of the present disclosure.

To obtain a quad atlas (or a quad partition) of the organic shape suitable for defining a meaningfully aligned control mesh (e.g., by fitting a T-Spline surface) a quantized global parameterization, such as the Integer Grid Map (IGM), can be computed (Bommes, D., Campen, M., Ebke, H.-C., Alliez, P., and Kobbelt, L., Integer-grid maps for reliable quad meshing, ACM Transactions on Graphics 32, 4, 1, 2013; Campen, M., Bommes, D., and Kobbelt, L., Quantized global parametrization, ACM Transactions on Graphics 34, 6, 1-12, 2015): $\phi: \mathbb{O} \to \Omega \in \mathbb{R}^2$. This map has the following valuable properties:

(1) No need to specify a cut network for the high genus organic forms often present in generative designs. (FIG. 9 shows examples 900, 910 of a high genus (88 and 54) generative design B-Reps generated using the fully automatic method of the present disclosure.) Instead, only a small number of cone singularities are required (Ray, N., Li, W. C., Levy, B., Sheffer, A., and Alliez, P., Periodic Global Parameterization, ACM Trans. Graph., ACM, 1460-1485, 2006), which can be obtained from a smooth, curvature tensor-aligned cross-field (Bommes, D., Zimmer, H., and Kobbelt, L., Mixed-integer quadrangulation, ACM Transactions on Graphics 28, 2009).

(2) Map singularities are mapped to integer points, and the image boundary $\phi: \mathbb{B} \to \partial\Omega$ consists of integer isolines, which allows the extraction of the quad partition $\{Q_i \cup Q_i = \Omega, Q_i^o \cap Q_j^o = \emptyset\}$ (Bommes, D., Campen, M., Ebke, H.-C., Alliez, P., and Kobbelt, L., Integer-grid maps for reliable quad meshing, ACM Transactions on Graphics 32, 4, 1, 2013).

(3) The quad mesh edges can be aligned along the shape principal curvatures by computing a smooth cross field (Bommes, D., Zimmer, H., and Kobbelt, L., Mixed-integer quadrangulation, ACM Transactions on Graphics 28, 2009).

(4) Shapes containing features of vastly varying sizes can be represented efficiently by specifying an adaptive size-field.

Equipped with $\phi: \mathbb{O} \to \Omega$ and its inverse $\phi^{-1}: \Omega \to \mathbb{O}$, next a construction of an organic T-spline surface fitting $\mathbb{O}$ is presented.

4.1—Cross-Field

The first step of the construction of an organic T-spline surface fitting $\mathbb{O}$ is to specify the desired edge orientation of the organic surface editable quad control mesh. As shown in Alliez, P., Cohen-Steiner, D., Devillers, O., Levy, B., and Desbrun, M., Anisotropic polygonal remeshing, Proc. of ACM SIGGRAPH 03, 485-493, 2003, edges sampled along the principal curvature directions (away from isotropic points) match closely human-designed control meshes, provide optimal approximation, naturally represent symmetries, and allow meaningful shape deformations when used as a tool for surface editing. Therefore, following the established mixed-interval quadrangulation (MIQ) method (Bommes, D., Zimmer, H., and Kobbelt, L., Mixed-integer quadrangulation, ACM Transactions on Graphics 28, 2009; U.S. Patent Publication No. 2012/0029882), a globally smooth cross-field matching the principal curvature directions on $\mathbb{O}$ (away from isotropic regions) is computed to specify the desired edge orientation of the quad mesh. Alternative curvature-aligned cross-field computation algorithms (e.g., Knöppel, F., Crane, K., Pinkall, U., and Schröder, P., Globally optimal direction fields, ACM Transactions on Graphics 32, 2013) are also applicable at this stage. To estimate curvature tensors on $\mathbb{O}$, the method in Restricted Delaunay Triangulations and Normal Cycle (Cohen-Steiner, D. and Morvan, J.-M., Restricted Delaunay triangulations and normal cycle, 19th Annu. ACM Sympos. Comput. Geom., 237-246, 2003) is applied, but other mesh curvature estimation methods are applicable as well, (e.g., Meyer, M., Desbrun, M., Schröder, P., and Barr, A. H., Discrete Differential-Geometry Operators for Triangulated 2-Manifolds, H.-C. Hege and K. Polthier, eds., Visualization and Mathematics III, Springer-Verlag, Heidelberg, 35-57, 2003; Cazals, F. and Pouget, M., Estimating differential quantities using polynomial fitting of osculating jets, Computer Aided Geometric Design 22, 121-146, 2005; Grinspun, E., Gingold, Y., Reisman, J., and Zorin, D., Computing discrete shape operators on general meshes, Computer Graphics Forum 25, 547-556, 2006).

The computed cross-field consists of a pair of orthogonal directions $\forall T_i \in \mathbb{O}$, representing the desired quad edge alignment, and contains a small number of singularities assigned to vertices where the field flow bifurcates. Since singularities break the quad edge flow, affecting the editability of O, a few adjustments are made to reduce them at $\mathbb{B}$.

Figure 10:
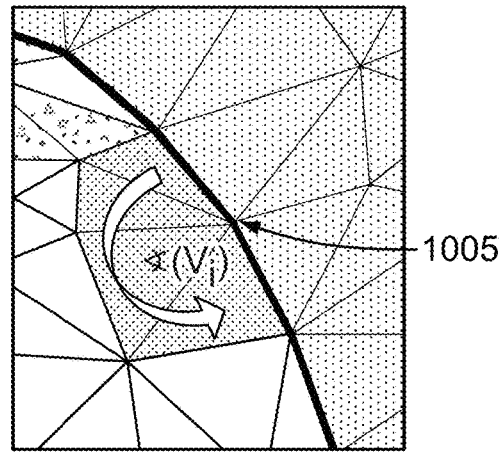
FIG. 10 shows an example of a boundary vertex with a flat interior surface angle.

First, add regularity constraints on all boundary vertices with a "flat" interior surface angle $$\left\{ V_i \middle| \frac{\pi}{2} < \sphericalangle(V_i) < \frac{3\pi}{2} \right\}$$

to prevent the computation from placing singularities on them. Due to the boundary relaxation step carried out in Section 3.3, vertices where this condition is violated are very few and far in-between. FIG. 10 shows an example of a boundary vertex 1005 with a flat interior surface angle.

Second, apply boundary curve tangent direction propagation in a small channel along $\mathbb{B}$, replacing the estimated principal curvature directions. This reinforces the boundary structure by aligning the cross-field to the boundary directions within the channel. The channel size is set automatically to match the expected local control mesh edge length.

Figure 11:
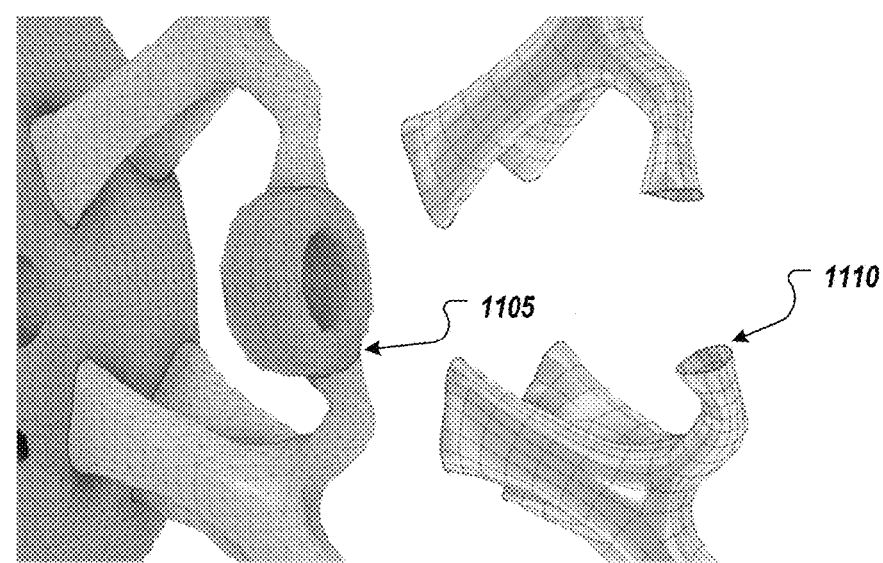
FIG. 11 shows an example of boundary relaxation after added regularity constraints on all boundary vertices with a flat interior surface angle and applied boundary tangent direction propagation.

FIG. 11 shows an example of boundary relaxation after added regularity constraints on all boundary vertices with a "flat" interior surface angle and applied boundary tangent direction propagation. Relaxation on the mesh boundary 1105 allows regularity constraints almost on the entire organic boundary without causing map distortion, leading to very regular easily editable organic surface boundaries 1110. These modifications lead to a simple, as regular as possible, quad structure along the control mesh boundary allowing improved outcomes when constructing contact curves between O and $\{S_i\}$.

4.2—Size-Field

Generative shapes are often composed of features of vastly different sizes. To avoid wasteful control mesh complexity on large-scale features and improve editability, a method can be applied to compute an anisotropic adaptive size-field that specifies the control mesh edge length sizes to cover adequately smaller features and avoid overrepresentation of larger features. An anisotropic size-field can be specified along the cross-field directions. The desired edge lengths $(d_{i,u}, d_{i,v})$ $\forall T_i \in \mathbb{O}$ can be set from Equation (6) in Alliez, P., Cohen-Steiner, D., Devillers, O., Levy, B., and Desbrun, M., Anisotropic polygonal remeshing, Proc. of ACM SIGGRAPH 03, 485-493, 2003:

$$d_{i,t}(\kappa_{i,t}) = \sqrt[2]{\epsilon_t \left(\frac{2}{|\kappa_{i,t}|} - \epsilon_t\right)}, t = \{u, v\},$$

where $(\kappa_{i,u}, \kappa_{i,v})$ are the estimated curvatures along the cross-field direction on $T_i$, and $(\epsilon_u, \epsilon_v)$ are automatically chosen to retain the smallest shape features by ensuring $\epsilon_t < 2/\max_i K_{i,t}$.

4.3—Parametrization

Applying the injective global parameterization method in Bommes, D., Campen, M., Ebke, H.-C., Alliez, P., and Kobbelt, L., Integer-grid maps for reliable quad meshing, ACM Transactions on Graphics 32, 4, 1, 2013 modified to use the quantitation algorithm in Campen, M., Bommes, D., and Kobbelt, L., Quantized global parametrization, ACM Transactions on Graphics 34, 6, 1-12, 2015, a quantized globally continuous map $\phi: \mathbb{O} \to \Omega$ is obtained, which conforms to the cross-fields and size-fields computed previously. The properties of this map allow an immediate definition of a T-Spline surface O parameterized over the quad atlas $\{Q_i | \cup Q_i = \Omega, Q_i^o \cap Q_j^o = \emptyset\}$.

The map inverse $\phi^{-1}: \Omega \to \mathbb{O}$ is computed and relaxed to improve the singularity positions and reduce distortion; $\phi^{-1}$ is used to build the bijective correspondence is $\eta: O \to \mathbb{O} = \phi^{-1} (O^{-1})$, mapping the organic surface to the organic mesh through $\Omega$.

4.4—Approximation

By providing $\eta$, a general T-Spline approximation method can be applied to compute a surface fitting $\mathbb{O}$. Depending on the application requirements, different strategies for how to specify the approximation problem are available depending on certain conditions. (1) If simpler, easier to edit organic surfaces are preferable, the control mesh vertex positions can be computed by solving the linear min $L^2(\mathbb{O}, O)$ problem without bounding the maximum deviation. In some implementations, O is represented as a Catmull-Clark surfaces as well. (2) If a tight fit of $\mathbb{O}$ is sought, the non-linear bound problem $L\infty(\mathbb{O}, O) < \delta$ for a tolerance $\delta > 0$ is solved. In this case, the approximation algorithm can interleave $L^2(\mathbb{O}, O)$ approximation with T-junctions refinement where $$\left\{Q_i \middle| \max_{p \in Q_i} |O(p) - \mathbb{O}(p)| > \delta\right\}.$$

In some implementations, the output is an adaptively refined T-NURCC surface (e.g., using an approach similar to that in Li, W.-C., Ray, N., and Levy, B., Automatic and Interactive Mesh to T-Spline Conversion, Proc. of the Symposium on Geometry Processing, 191-200, 2006). Since $\mathbb{O}$ approximates a smooth surface within the generative solver accuracy limits, $\delta$ is set accordingly (e.g., $\delta = \sqrt{3} \times$ the voxel grid edge length for level-set based solvers). (3) A restricted tight fit of $\mathbb{B}$ can be requested to guarantee surface accuracy near the joints with the input solids. In this case, $L\infty(\mathbb{B}, \partial O) < \delta$ is solved for the boundary control points, and the fitting in the interior is completed by solving min $L^2(\mathbb{O}, O)$. In some implementations, an adaptively refined T-NURCC surface is computed, where the T-NURCC surface approximates the organic boundary tightly (solve $L\infty(\mathbb{B}, \partial O) < \delta$) but approximates the interior more loosely (solve min $L^2(\mathbb{O}, O)$) as a compromise between surface complexity and accuracy. For further details regarding such approximation approaches, see U.S. Patent application Ser. No. 16/388,771, filed Apr. 18, 2019, published on May 14, 2020 as U.S. Patent Publication No. 2020-0150624, titled, "CONVERSION OF MESH GEOMETRY TO WATERTIGHT BOUNDARY REPRESENTATION", and issued as U.S. Pat. No. 11,016,470 on May 25, 2021, which application is incorporated herein by reference.

5—Boundary Contact

For the composed output B-Rep to be watertight, the organic surface boundaries $\partial O = \cup \partial O_i$ should be contained in the volume $\mathbb{S} = \cup S_i$, i.e., $\partial O \subset \mathbb{S}$. Hence, a pull modification is applied to the organic surface boundaries $\{O_{i,j}\}$ to construct the corresponding B-Rep contact curves $\{C_{i,j} = \partial O_i \cap S_j\}$. This ensures the successful outcome of the subsequent watertight B-Rep composition. This is identical for all organic surface boundary curves to $\{\partial O_{i,j}\}$ so the index pair i,j is omitted.

Figure 12:
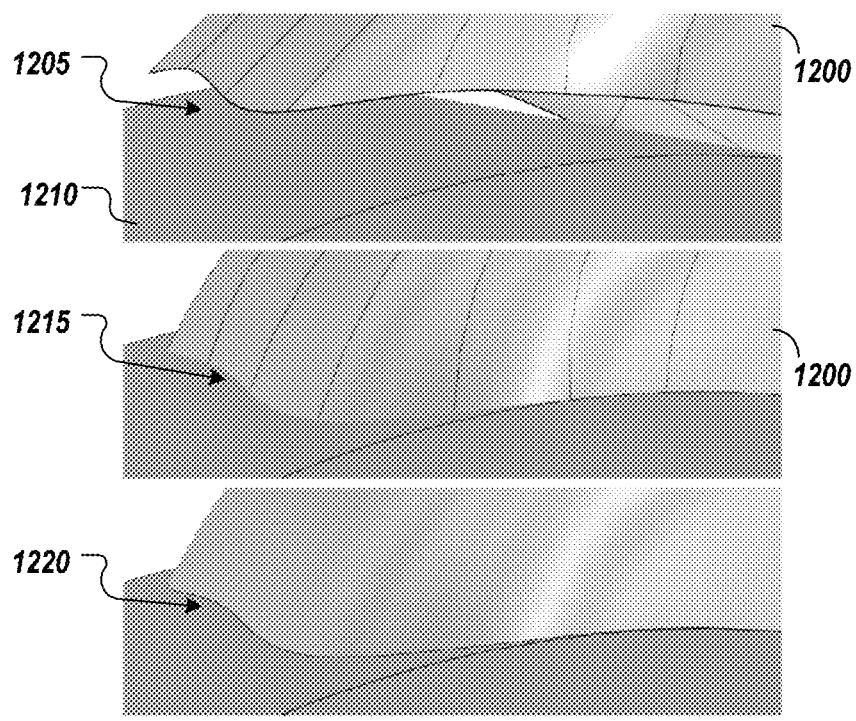
FIG. 12 shows an example of an organic boundary surface before and after the pull modification that results in a homeomorphic curve.

FIG. 12 shows an example of an organic boundary surface 1200 before and after the pull modification that results in a contact curve homeomorphic to the corresponding boundary curve. A generative design with a low sampling accuracy causes a large visible gap 1205 between the boundary organic surface 1200 and the contact input solid 1210. The pull algorithm is applied on the organic surface 1200 to remove the gap, as shown at 1215. The intersection curve is homeomorphic to the corresponding organic boundary curve, which allows the construction of a watertight output B-Rep 1220.

5.1—Boundary Correspondence

Following the boundary restriction $\partial \eta \to \mathbb{B}$ of the bijective correspondence $\eta$ constructed in Section 4.3, the solid S incident with $\mathbb{B}$ is determined and correspondingly with $\partial O$. In some implementations, the solid S incident with $\mathbb{B}$ is determined from the mesh partitioning computed in section 2.2 above. If multiple adjacent solids of different types are incident with the same boundary curve, then S is the union of these multiple adjacent solids. By construction, such solids have overlapping boundaries and therefore their union defines a valid, path-connected solid. From the IGM, the corresponding organic surface boundary can be found, $\phi$: $\mathbb{B} \to \partial O$.

5.2—Boundary Pull

Let $D_j(\ )$ be the signed distance of $\partial S$, $D(p) \leq 0$ for $p \in S$; $\partial O$ is "pulled" so that $$D(\partial O) = \max_{p \in \partial O} D(p) \leq \xi,$$

where $\xi < 0$ is a negative safety tolerance adapted to ensure that the intersection $C = O \cap \partial S$ and $\partial O$ are homeomorphic (see Section 5.3 below). Having $D(\partial O) \leq \xi < 0$ implies $\partial O \subset S^0$, therefore the contact between S and O is watertight.

Using the NURBS parameterization $c(t) = \Sigma_i\, c_i B_i(t)$ of $\partial O$, where $\{B_i\}$ are the NURBS basis functions along $\partial O$ and $\{c_i\}$ are the corresponding surface boundary control points, evaluate $$D(\partial O) = \max_{p \in \partial O} D(p) = \max_t D(c(t))$$

and $\nabla D\,(\partial O)$ with respect to $\{c_i\}$:

$$\nabla D(\partial O) = \left(\ldots, \frac{\partial \max_t D(c(t))}{\partial c_i}, \ldots\right).$$

Next, apply the gradient descent method to move $\{c_i\}$ along $-\nabla D\,(\partial O)$ until $D(\partial O) \leq \xi$.

To implement efficiently the evaluations of $D(c(t))$, a hierarchical space parametrization around $\mathbb{S}$ is used. The line search $$\min_t D(c(t))$$

can be sped up by maintaining a dense uniform sample grid $\{t_j\}$ over the domain of $c(t)$, caching the basis function values $\{B_i(t_j)\}$. Finally, loosely approximating the partial derivatives $\partial D(\partial O)/\partial c_i$ with the unit normal $\vec{n}_i$ at the projection point $q_i \in \partial S$ of $c_i$ works quite well and reduces significantly the computation time. If $q_i$ happens to lie on a sharp edge or a corner vertex, define $n_i$ as the average of the surface normals incident with $q_i$.

The pull process typically converges quickly in a few iterations. Occasionally, cases are encountered where the algorithm fails to pull small segments of the boundary inside S within a certain iteration number (e.g., 100). In such cases, the segments can be corrected by bisecting them by local insertion (Sederberg, T. W., Cardon, D. L., Finnigan, G. T., North, N. S., Zheng, J., and Lyche, T., T-spline simplification and local refinement, Proc. of ACM SIGGRAPH 04, 276-283, 2004) of a new boundary vertex and rerunning the pull algorithm. The boundary pull and refinement can be iterated until convergence; in most instances of this issue, only a few new vertices and refinement steps are needed.

5.3—Safety Tolerance

In practice, due to accuracy limitations of the underlying geometry representations, surface-surface intersection implementations may fail to compute a correct intersection result if the boundary of one of the surfaces is nearly coincident with the other surface. Therefore, if $\partial O$ is nearly coincident with $\partial S$, the computed intersection $C = O \cap \partial S$ may not be homeomorphic to $\partial O$.

To handle such situations, the pull modification can be initially set to $\xi = -1 \times$(the underlying accuracy tolerance used by the intersection algorithm computing $C = O \cap \partial S$). Once the pull is complete, compute $C = O \cap \partial S$ and check if it is homeomorphic with $\partial O$. If this is not the case, the safety tolerance can be raised by a scalar value (e.g., $\xi \to 2\xi$) and pulling can be resumed. Applying this strategy iteratively allows accuracy limitations to be handled robustly. As a performance optimization, it may be preferable to initialize $|\xi|$ with a larger initial tolerance if it is known that the underlying surface accuracy is limited.

5.4—Tolerant Modelling

Some B-Rep modelling kernels, (e.g., Siemens Parasolid) support "tolerant" edges and vertices representing contact curves and points for non-intersecting or partially-intersecting surfaces (Jackson, D. J., Boundary representation modelling with local tolerances, Proceedings of the third ACM symposium on Solid modeling and applications—SMA '95, ACM Press, 247-254, 1995). If tolerant modelling capabilities are available, a distance $\mu > 0$ representing the largest supported tolerance bounding the contact surfaces gap can be specified. Then, set $\xi = \mu > 0$ to pull $\partial O$ within $\mu$ from S. Hence, there is no need to compute $C = O \cap \partial S$, as $C = \partial O = O \cap S_\mu$ is prescribed, where $S_\mu = \{p | D(p) \leq \mu\}$.

5.5—Organic Shape Change

Incidence construction in Section 2.1 implies that $\mathbb{B}$ is contained within a distance $d > 0$ from S, where $d \approx$ the generative solver accuracy. Consequently, $D\,(\partial O) \leq 2d$ initially if the fitting strategies $L^\infty(\mathbb{O}, O) < d$ or $L^\infty(\mathbb{B}, \partial O) < d$ in Section 4.4 are applied. Therefore, the shape change introduced by a "pull" of ~2d is within the design accuracy tolerance and does not affect the validity of the generative result.

If the simpler problem min $L^2(\mathbb{O}, O)$ in Section 4.4 is solved instead, the initial $D(\partial O)$ is unbounded. However, in practice $\partial O$ is sufficiently close to S for the introduced changes to be acceptable. B-Rep modelling computations are many orders of magnitude more accurate than the generative representation sampling tolerance. Hence, $|\xi| << d$ and the shape change caused by the additional safety tolerance pull $D\,(\partial O) \leq \xi \leq 0$ is negligible.

6—Composition

Next, a watertight B-Rep representing the generative design is composed by combining the organic surfaces $\{O_i\}$ and the input solids $\{S_i\}$. Contact curves for all boundaries $\{\partial O_i\}$ are now constructed, so it only remains to determine what volume must be assigned to the output generative B-Rep.

So far, keep-in and keep-out input solids have not been disambiguated. Define the subsets $\mathbb{S} = \mathbb{K} \cup \mathbb{L} \cup \mathbb{P}$ where $\mathbb{K}$, $\mathbb{L}$ and $\mathbb{P}$ are the keep-in, keep-out and seed input solids, respectively.

6.1—Surface Boolean $\mathbb{S}$ and $\{O_i\}$ can be combined using existing well-established Boolean operations that function on solids and orientated sheets (Granados, M., Hachenberger, P., Hert, S., Kettner, L., Mehlhorn, K., and Seel, M., Boolean Operations on 3D Selective Nef Complexes Data Structure, Algorithms, and Implementation, Algorithms—ESA 2003: 11th Annual European Symposium, Springer, 174-186, 2003; Hachenberger, P. and Kettner, L., 3D Boolean Operations on Nef Polyhedra, CGAL User and Reference Manual, CGAL Editorial Board, 2018). One way to combine $\mathbb{S}$ and $\{O_i\}$ includes the following steps: (1) combine the surfaces $\{O_i\}$ into a single (disjoint) orientated sheet $P=\cup P_i$; and (2) perform a Boolean unite $\mathbb{G}=\mathbb{S}\cup P$. Because by construction of $\partial P \subset \mathbb{S}$, the operation forms a valid solid $\mathbb{G}$; (3) subtract the keep-out solids to yield the desired output B-rep $\mathbb{G}\setminus\mathbb{L}$.

6.2—Cellular Composition

Alternatively, cellular modelling techniques, which are well established in the art (Amon, D., A cellular decomposition algorithm for semialgebraic sets, Springer, Berlin, Heidelberg, 301-315, 19) can be used. This has the following advantages: Boolean operations on oriented sheets and partial solids have always proved confusing and counterintuitive both for users and developers; and the cellular approaches yield an intermediate cell decomposition of the generative design, which can be used to customize the result or diagnose failures due to bad input.

6.2.1—Cell Creation

A "universe" void-less solid $\mathbb{U}$ is constructed (e.g., as an expanded bounding box or sphere) that strictly contains all input solids and organic surfaces $\mathbb{S}\cup\{O_i\}\subset\mathbb{U}$. $\mathbb{U}$ is partitioned into path-connected solid cells $\{U_i|\cup U_i=\mathbb{U}, U_i^\circ\cap U_j^\circ=\emptyset\}$ bounded by the organic surfaces $\{O_i\}$, the solid surfaces $\{\partial S_i\}$, and the universe surface $\partial\mathbb{U}$, i.e., $\{\partial U_i\}=\{O_i\}\cup\{\partial S_i\}\cup\partial\mathbb{U}$. By construction, there is a single cell $U_0$ containing the universe boundary $\partial\mathbb{U}\subset\partial U_0$: discard $U_0$, and the remaining cells will satisfy $\{\partial U_i\}=\{O_i\}\cup\{\partial S_i\}$.

6.2.2—Cell Classification

Figure 13:
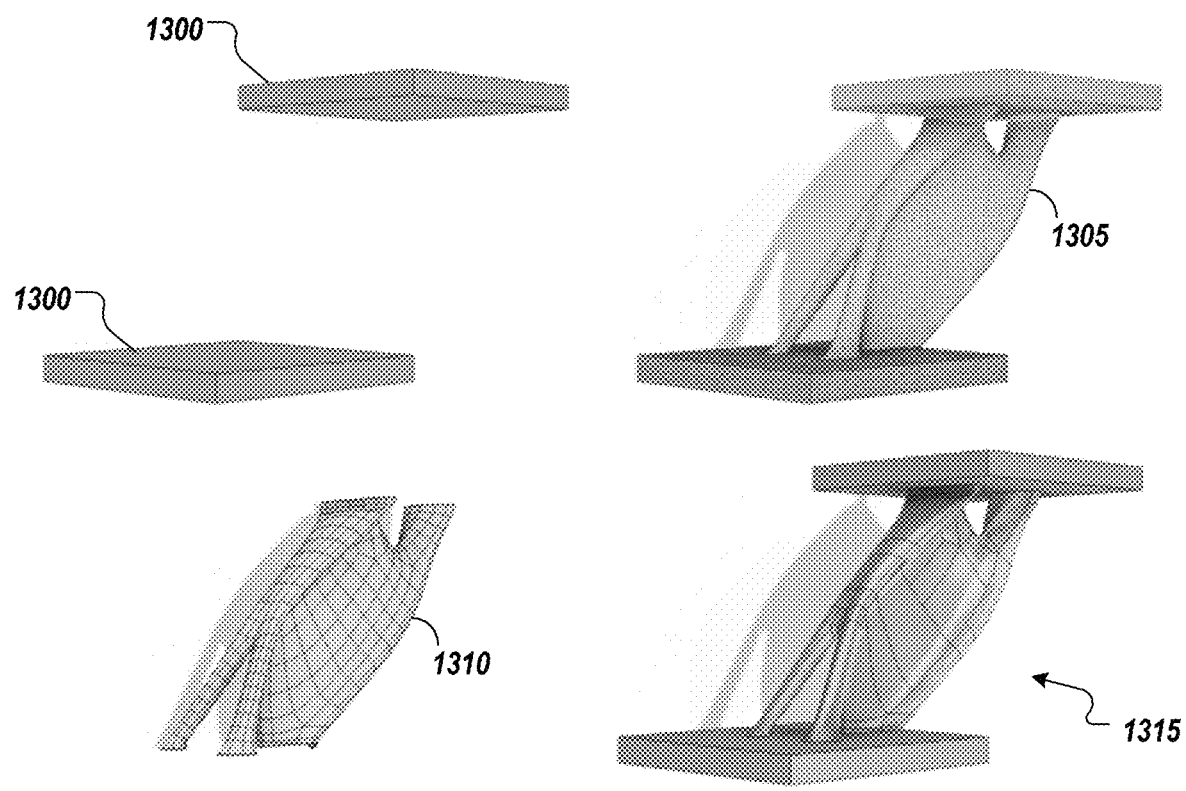
FIG. 13 shows an example of a process for composing a watertight B-Rep.

FIG. 13 shows an example of a process for composing a watertight B-Rep. Input solids 1300 and a mesh partitioning 1305 are used to control combining an organic T-Spline surface 1310 (or other surface type, e.g., T-NURCC surface) with the input solids 1300 to form a watertight B-Rep 1315. Each $U_i$ is determined as either inside or outside of the final generative B-Rep. If $U_i\subseteq S_j$ for some $S_j\subseteq\mathbb{K}$, $U_i$ is classified as inside, otherwise as outside. For all other cells, the cell boundary $\partial U_i$ is inspected.

Let $\{F_{ij}\}$ be the surface face partition of $\partial U_i$, $\{F_{ij}|\cup F_{ij}=\partial U_i, F_{ij}^\circ\cap F_{ik}^\circ=\emptyset\}$, where each face $F_{ij}$ coincides with a path-connected subset of a single surface $O_k$ or $\partial S_k$: (1) if $\forall F_{ij}, F_{ij}\subset\{\partial S_k\}$, $U_i$ is classified outside if it is a void of $\mathbb{S}$, or inside otherwise, since then $U_i\subseteq S_j\in\mathbb{P}$; (2) if $\exists F_{ij}, F_{ij}\subseteq O_k\in\{O_k\}$, and $O_k$ has the same orientation as $F_{ij}$, then the cell is provisionally classified inside; (3) if $\exists F_{ij}, F_{ij}\subseteq O_k\in\{O_k\}$, and $O_k$ has the opposite orientation of $F_{ij}$, then the cell is provisionally classified outside; (4) if both (2) and (3) are true, then the cell is classified inside and a diagnostic indicating an invalid algorithm input is reported. (5) Otherwise, the provisional classification is adopted. Then, the output generative solid B-Rep is composed by uniting all inside cells $\{U_i\}$.

Figure 14:
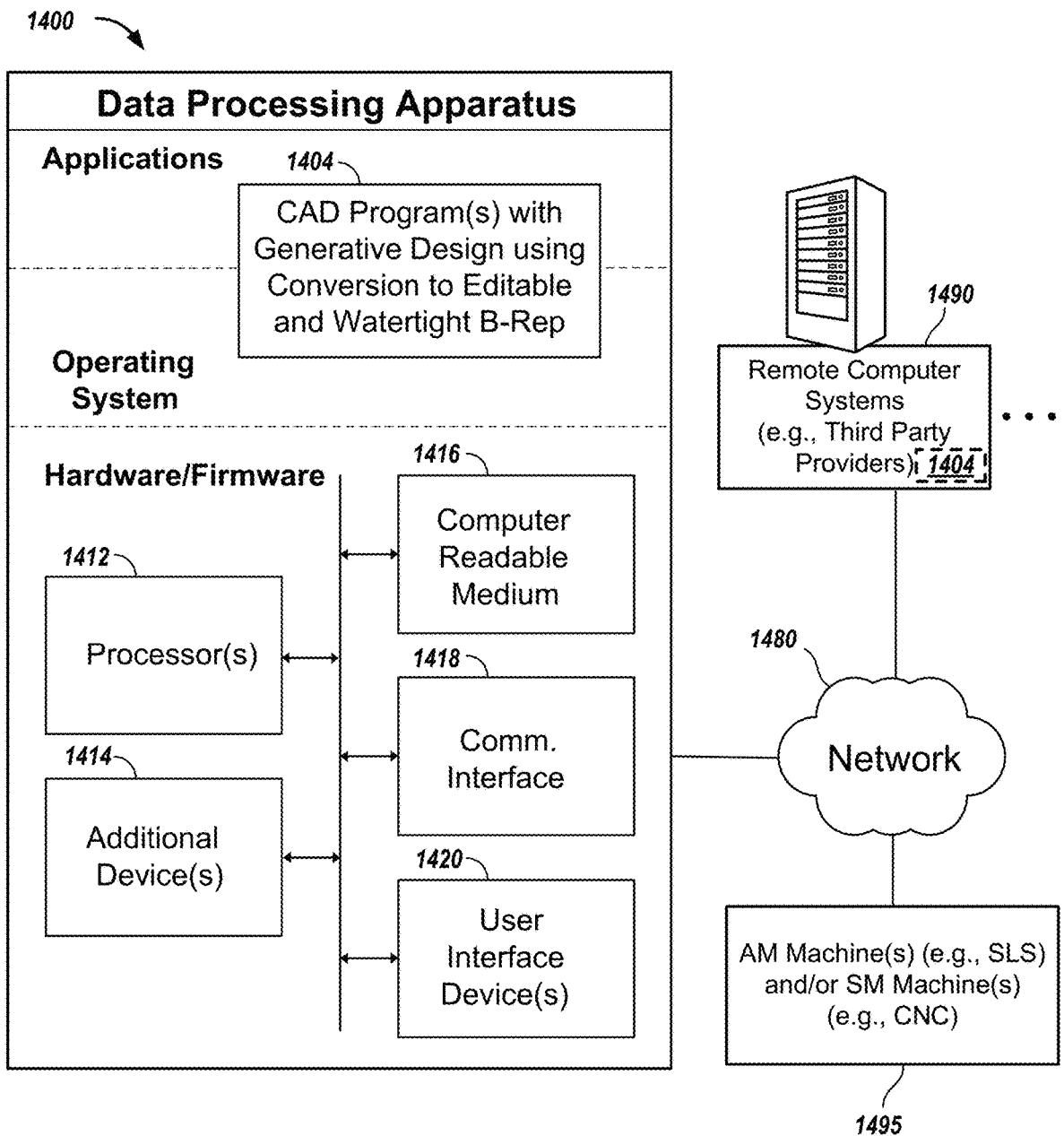
FIG. 14 is a schematic diagram of a data processing system including a data processing apparatus.

FIG. 14 is a schematic diagram of a data processing system including a data processing apparatus 1400 (also referred to as computer 1400) which can be programmed as a client or as a server. The data processing apparatus 1400 is connected with one or more computers 1490 through a network 1480. While only one computer is shown in FIG. 14 as the data processing apparatus 1400, two or more computers can be used. The data processing apparatus 1400 includes various software modules, which can be distributed between an applications layer and an operating system. These can include executable and/or interpretable software programs or libraries, including tools and services of one or more CAD programs 1404 that implement the systems and techniques described in this application. Thus, the CAD program(s) 1404 convert generative design meshes into editable and watertight B-Rep models, as described herein. Further, the CAD program(s) 1404 can provide additional functions and features, including implementing the generative design processes (e.g., a generative design solver that employs one or more level set methods to automatically create a 3D model design) and/or functions of Computer Aided Engineering (CAE), Computer Aided Manufacturing (CAM) and Computer Numerical Control (CNC) programs for additive manufacturing and/or subtractive manufacturing. The number of software modules used can vary from one implementation to another. Moreover, the software modules can be distributed on one or more data processing apparatus connected by one or more computer networks or other suitable communication networks.

The data processing apparatus 1400 also includes hardware or firmware devices including one or more processors 1412, one or more additional devices 1414, a non-transitory computer readable medium 1416, a communication interface 1418, and one or more user interface devices 1420. Each processor 1412 is capable of processing instructions for execution within the data processing apparatus 1400. In some implementations, the processor 1412 is a single or multi-threaded processor. Each processor 1412 is capable of processing instructions stored on the computer readable medium 1416 or on a permanent storage device such as one of the additional devices 1414. The data processing apparatus 1400 uses the communication interface 1418 to communicate with one or more computers 1490, for example, over the network 1480. Examples of user interface devices 1420 include a display, a camera, a speaker, a microphone, a tactile feedback device, a keyboard, a mouse, and virtual reality (VR) and/or augmented reality (AR) equipment. The data processing apparatus 1400 can store instructions that implement operations associated with the program(s) described herein, for example, on the computer readable medium 1416 or one or more additional devices 1414, which also contain non-transitory computer readable media such as non-transitory computer readable medium 1416, for example, one or more of a hard disk device, an optical disk device, a tape device, and a solid state memory device.

The system of FIG. 14 is usable to design and potentially manufacture physical structures, where CAD program(s) 1404 implement three-dimensional (3D) modeling functions and conversion of mesh geometry to a watertight boundary representation for a part to be manufactured. The mesh geometry can be obtained from different sources, but generally, the mesh geometry will be associated with one or more modelled solids that are in a boundary representation format. In some implementations, the system includes a 3D scanner (not shown) that scans a physical object to generate a mesh representation of the physical object, and the CAD program(s) 1404 can use this input mesh to generate the one or more modelled solids (e.g., B-Reps) by fitting regular geometrical shapes to the mesh, and the CAD program(s) 1404 can use the systems and techniques described herein to convert remaining portions of the mesh (those portions that are too complex to be modeled using regular geometrical shapes) to a boundary representation format (e.g., B-Reps) and connect them with the one or more modelled solids. In this example, the CAD program(s) 1404 include scanning and modelling functions.

In some implementations, the CAD program(s) 1404 implement one or more generative design processes that employ material or microstructure techniques and/or geometrical or macrostructure techniques for generative design (e.g., Solid Isotropic Material with Penalization (SIMP) and/or level-set methods for topology optimization). The one or more modelled solids can be produced in (or loaded into) the CAD program(s) using traditional 3D modelling techniques, and these modelled solid(s) (also referred to as input solid(s)) can be used as one or more sub-spaces of an optimization domain of a generative design process. Thus, the generative design process can output a mesh representing automatically generated geometry that is to connect with the modelled solid(s) used as input. Further, the CAD program(s) 1404 can implement physical simulation (finite element analysis (FEA) or other) and also manufacturing control functions, in various implementations.

As used herein, CAD refers to any suitable program used to design physical structures that meet specified design requirements, regardless of whether or not the program is capable of interfacing with and/or controlling specific manufacturing equipment. Thus, CAD program(s) 1404 can include CAE program(s), CAM program(s), etc. The program(s) 1404 can run locally on computer 1400, remotely on a computer of one or more remote computer systems 1490 (e.g., one or more third party providers' one or more server systems accessible by the computer 1400 via the network 1480) or both locally and remotely. Thus, a CAD program 1404 can be two or more programs that operate cooperatively on two or more separate computer processors in that a program 1404 operating locally at computer 1400 can offload processing operations (e.g., mesh conversion, generative design and/or physical simulation operations) "to the cloud" by having one or more programs 1404 on one or more computers 1490 perform the offloaded processing operations.

The CAD program(s) 1404 can present a user interface (UI) on a display device 1420 of the computer 1400, which can be operated using one or more input devices 1420 of the computer 1400 (e.g., keyboard and mouse). Various subsets of the input and output devices 1420 can be separate from or integrated with each other and/or with the computer 1400, such as in a tablet computer (e.g., a touch screen can be an input/output device 1420). Moreover, the computer 1400 can include or be part of a VR or AR system. For example, the input/output devices 1420 can include a VR/AR input glove and/or a VR/AR headset.

As noted above, the CAD program(s) 1404 implement 3D modeling functions, which means a 3D model can be built using the CAD program(s) 1404. The CAD program(s) 1404 can implement physical simulation (locally and/or by remote procedure call) to assist in building the 3D model. Physical simulations, such as FEA, Computational Fluid Dynamics (CFD), Acoustics/Noise Control, thermal conduction, and/or computational injection molding simulations are often integral components in CAD-based product development. The CAD program(s) 1404 can be used to build precise geometric descriptions of the design model, while physical simulations enable improved performance without time consuming physical testing.

The CAD program(s) 1404 can provide user interface elements that enable the user to specify inputs for physical simulation(s), such as materials and loading cases for the 3D model(s), where the loading cases define loads in different directions to be borne by a part being designed during use of the part. Thus, a user can interact with the UI of the CAD program(s) 1404, including producing a full mechanical problem definition for a part to be manufactured, so as to build and modify 3D model(s), which can be stored in 3D model document(s). As will be appreciated, many possible 3D models can be designed using the systems and techniques described herein.

Moreover, the CAD program(s) 1404 can implement at least one generative design method (locally and/or by remote procedure call) which enables the CAD program(s) 1404 to generate one or more portions of the 3D model(s) automatically (or the entirety of a 3D model) based on design criteria, where the geometric design is iteratively optimized based on simulation feedback. Note that, as used herein, "optimization" (or "optimum") does not mean that the best of all possible designs is achieved in all cases, but rather, that a best (or near to best) design is selected from a finite set of possible designs that can be generated within an allotted time, given the available processing resources. The design criteria can be defined by the user, or by another party and imported into the CAD program(s) 1404. For example, a design space, load cases, and design criteria can be obtained for the modelled object by the CAD program(s) 1404 by receiving user input, e.g., via UI on display device 1420.

The 3D model includes one or more modelled solids that are used as input (e.g., B-Reps that are preserve bodies input) to the generative design process, which generates a mesh therefrom in view of the boundary conditions set by the input geometry. Various generative design processes can be used to optimize the shape and topology of the mesh portion of the 3D model. The input solid(s) can be converted to mesh geometry for use as input to the generative design process, the mesh output from the generative design processes can include mesh portions that correspond to the input solid(s), and these portions can be removed to result in the organic mesh portion of the generated model. This mesh portion is then converted into an editable boundary representation format (e.g., B-Rep, T-spline, subdivision surface, and/or other computer 3D modelling formats) and connected to the modelled solid(s) to form a watertight model of the generatively designed object.

In addition, in some implementations, the CAD program(s) 1404 implement manufacturing control functions. Once the user is satisfied with a 3D model, the 3D model can be stored as 3D model document(s) and/or be used to generate another representation of the model (e.g., an .STL file for additive manufacturing). This can be done upon request by the user, or in light of the user's request for another action, such as sending the 3D model to additive manufacturing (AM) machine(s) 1495, or other manufacturing machinery, which can be directly connected to the computer 1400, or connected via a network 1480, as shown. This can involve a post-process carried out on the local computer 1400 or a cloud service to export the 3D model to an electronic document from which to manufacture. Note that an electronic document (which for brevity will simply be referred to as a document) can be a file, but does not necessarily correspond to a file. A document may be stored in a portion of a file that holds other documents, in a single file dedicated to the document in question, or in multiple coordinated files.

In any case, the CAD program(s) 1404 can provide a document (having toolpath specifications of an appropriate format) to the AM machine 1495 to produce the physical structure corresponding to the generatively designed 3D model. The AM machine 1495 can employ one or more additive manufacturing techniques, such as granular techniques (e.g., Powder Bed Fusion (PBF), Selective Laser Sintering (SLS) and Direct Metal Laser Sintering (DMLS)), extrusion techniques (e.g., Fused Deposition Modelling (FDM), which can include metals deposition AM). In some cases, the AM machine 1495 builds the physical structure directly, and in some cases, the AM machine 1495 builds a mold for use in casting or forging the physical structure. In addition, the user can save or transmit the 3D model for later use. For example, the CAD program(s) 1404 can store the document(s) that includes the 3D model.

In some implementations, the CAD program(s) 1404 implement manufacturing control functions for subtractive manufacturing (SM) machine(s) 1495 (e.g., a Computer Numerical Control (CNC) milling machine, such as a multi-axis, multi-tool milling machine) to be used in the manufacturing process. For example, the CAD program(s) 1404 can generate CNC instructions for a machine tool system 1495 that includes multiple tools (e.g., solid carbide round tools of different sizes and shapes, and insert tools of different sizes that receive metal inserts to create different cutting surfaces) useable for various machining operations. Thus, in some implementations, the CAD program(s) 1404 can provide a corresponding document (having toolpath specifications of an appropriate format, e.g., a CNC numerical control (NC) program) to the SM machine 1495 for use in manufacturing the physical structure using various cutting tools, etc.

In some implementations, the CAD program(s) 1404 provide instructions to build a workpiece in a first stage of manufacturing, e.g., using direct AM and/or using forging and/or casting methods, and the CAD program(s) 1404 also provide instructions to machine the workpiece, e.g., roughing and/or finishing operations, in a second stage of manufacturing, e.g., in a 3-axis CNC milling system in order to form the completed structure. In general, various different manufacturing systems and techniques can be employed, either alone or in combination, to produce a final structure, and the CAD program(s) 1404 can include suitable algorithms to generate toolpath specifications for one or more of these various systems to manufacture a part that has been designed using the systems and techniques described in this application.

Figure 15:
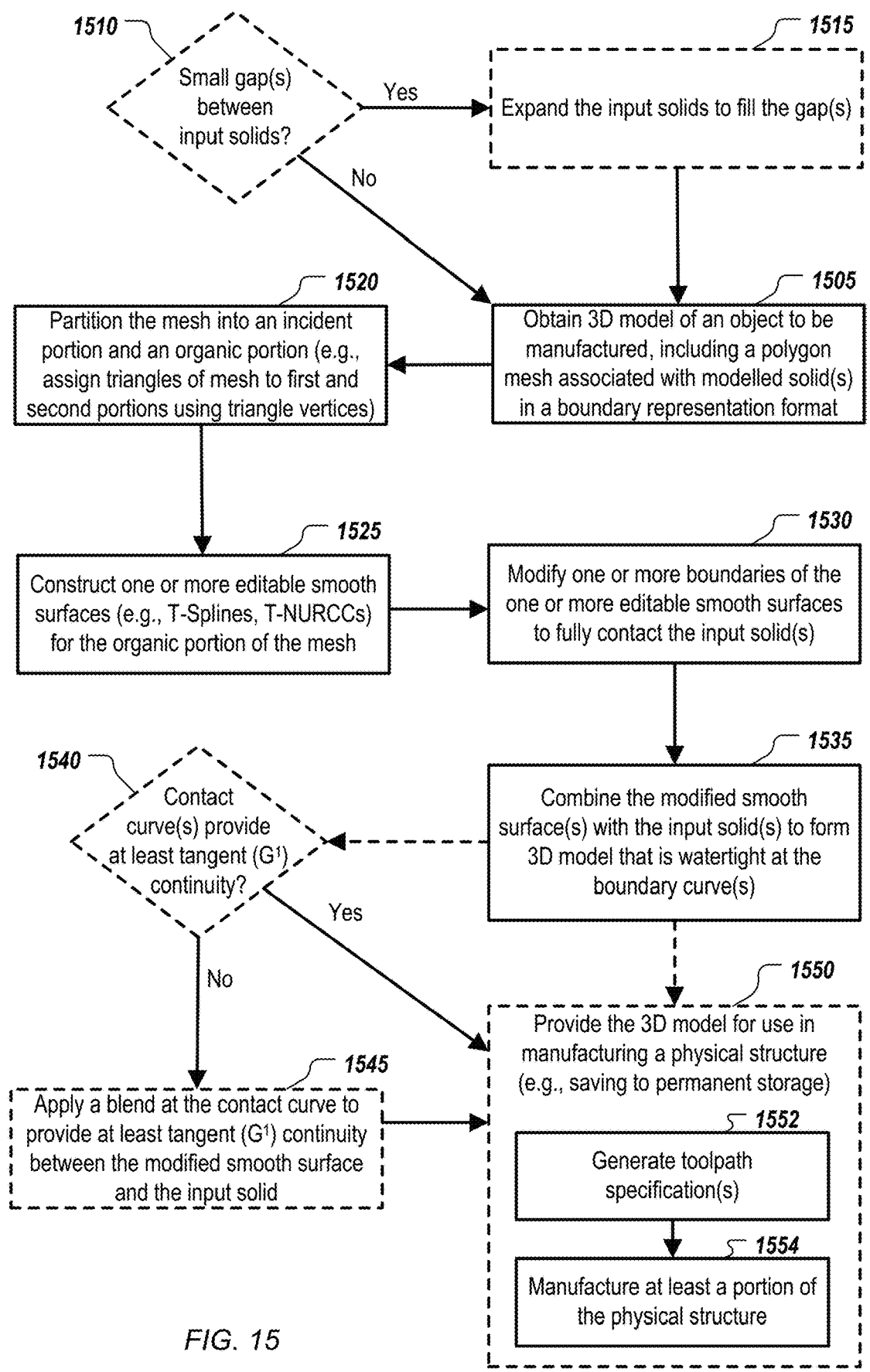
FIG. 15 shows an example of a process to convert mesh geometry to a watertight boundary representation for an object to be manufactured.

FIG. 15 shows an example of a process to convert mesh geometry to a watertight boundary representation for an object to be manufactured. A first 3D model of an object to be manufactured is obtained 1505, e.g., by the CAD program(s) 1404. The first 3D model includes a polygon mesh associated with one or more modelled solids, e.g., a polygon mesh resulting from a generative design process employing one or more input solids (in a boundary representation format) as one or more sub-spaces of an optimization domain of the generative design process. The generative design process can employ a volumetric mesh method to create the generative design for the object. The generative design process can employs a level set method to create the generative design for the object. Moreover, the obtaining 1505 can include invoking the generative design process to produce the generative design or receiving the generative design from another process or source.

The polygon mesh can be a triangle mesh, either originally or by conversion thereto, but various types of mesh formats can be used, including tetrahedral or hexahedral meshes. Moreover, while the focus of this disclosure is on generative design, where the polygon mesh coincides with a boundary of the generative design, other implementations are possible. For example, the one or more modelled solids in the boundary representation format (e.g., B-Reps) can be regular geometric shapes that have been fit to a scanned mesh, rather than being modelled solid(s) used as input to a generative design process.

In addition, the process can optionally include a check 1510 (in the case that there are two or more input solids for the generative design process) to detect one or more gaps (between at least two of the two or more input solids) that are smaller than an accuracy of the generative design process. Generative design constraint setups occasionally contain very small gaps that are inadvertently left between adjacent input solids, usually of different types, e.g., keep-in or and keep-out solids. In practice, solvers ignore such gaps and "unite" the solids in their representation. This is especially evident in level set representations where it is often impractical to reduce the voxel grid size to capture tiny gaps. If $\partial O$ intersects such gaps, the pull algorithm (see e.g., section 5.2 above) cannot converge as the small parts of $\partial O$ inside the gaps cannot be pulled in $\mathbb{S}^0$. To resolve this issue, these small gaps can be detected 1510 in the generative setup, and the input B-Rep solids can be expanded 1515 to fill the gaps. This check and expansion is shown as occurring before the obtaining 1505 of the first 3D model, but this check and expansion can also be performed after the obtaining 1505 of the first 3D model in some implementations.

The polygon mesh is partitioned 1520, e.g., by the CAD program(s) 1404, into a first portion that is incident with the one or more input solids and a second portion that is not incident with the one or more input solids. Various approaches to this partitioning are possible, such as described above in section 2. In general, a particular polygon in the mesh need not be entirely contained by an input solid to be considered incident with the one or more input solids, i.e., to be considered a non-organic portion of the mesh, and a particular polygon in the mesh need not be entirely outside of all input solid(s) to be considered non-incident with the one or more input solids, i.e., to be considered an organic portion of the mesh.

In some implementations, the partitioning 1520 involves assigning triangles of the mesh to the first (incident) portion based on incidence data determined in accordance with generative design information associated with an accuracy of the generative design process. For example, the generative design information can include distance information, and the assigning 1520 can include assigning triangles to the first (incident) portion based on a threshold distance between vertices of the triangles and the one or more input solids, where a vertex of a triangle is treated as being incident with an input solid when the vertex is contained by or within the threshold distance of a surface of the input solid. The threshold distance corresponds to a discretization accuracy of the representation of the generative design created by the generative design process, e.g., the threshold can be set based on the level set grid cell size or the maximum distance between a volumetric mesh element discretization and the input B-Reps. Thus, the inherent fuzziness of the generative design output is accounted for in the partitioning 1520. Further detailed examples of the partitioning 1520 are provided above in sections 2.1, 2.2, and 2.3.

Figure 16:
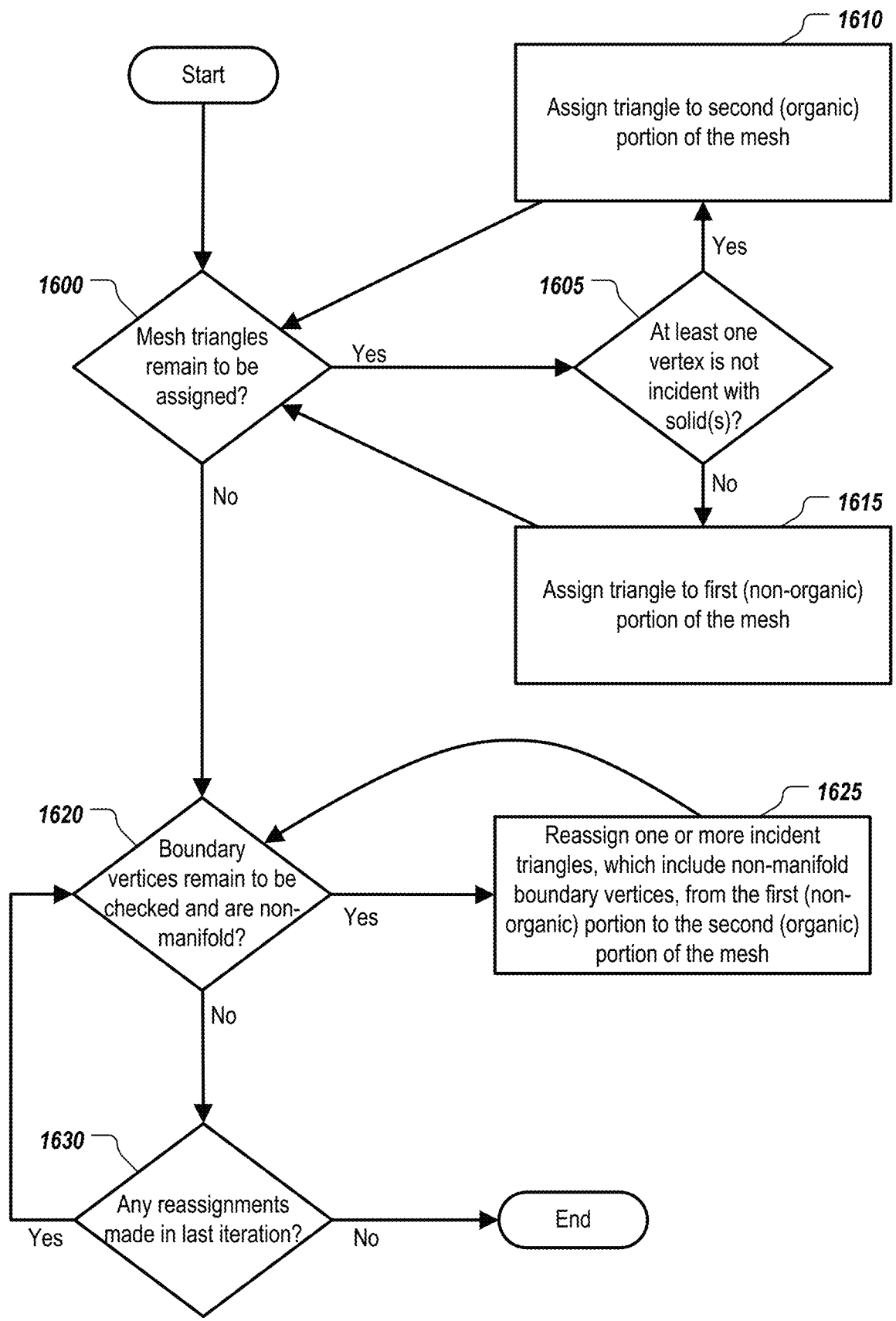
FIG. 16 shows an example of a process to partition mesh geometry, generated by topology optimization of a CAD solid model, in which non-manifold boundary vertices are eliminated.

In addition, FIG. 16 shows an example of a process to partition mesh geometry, generated by topology optimization of a CAD solid model, in which non-manifold boundary vertices are eliminated. The process begins checking the triangles of the mesh to assign them to either a first (non-organic) portion of the mesh or a second (organic) portion of the mesh. The first portion of the mesh is "non-organic" in the sense that it corresponds to one or more smooth and precise mathematical surfaces, which can be one or more modelled solids provided as input to a generative design process, or be regular geometrical shapes fit to a mesh output of a scanner. The second portion of the mesh is "organic" in the sense that it represents a complex shape produced by a generative design process, or by a scanner that generates a shape that is not readily modelled using regular geometrical shapes fit to the mesh.

While mesh triangles remain to be assigned 1600, a check 1605 is made for each triangle to determine whether the triangle has at least one vertex that is not incident with any of the modelled solid(s). When a triangle has at least one vertex that is determined as not being incident with an input solid (or a generated solid) the triangle is assigned 1610 to the second (organic) portion. Otherwise, the triangle is assigned 1615 to the first (non-organic) portion of the mesh. Thus, a triangle can be assigned to the organic part of the mesh even when two of the three vertices of the triangle are contained by an input solid. Further, as explained elsewhere in this application, e.g., section 2.1 above, a vertex of a triangle need only be within a threshold distance of a modelled solid to be considered to be incident with the modelled solid. Thus, a triangle with no vertices contained by an input solid can be assigned to the non-organic (incident) part of the mesh if all three of those vertices are within the threshold distance set by the discretization accuracy (of the generative design process or of the scanner).

Once the triangles of the mesh have been assigned to either the first (incident/non-organic) portion or the second (organic/non-incident) portion of the mesh, and additional check and reassignment process can be employed as part of the partitioning process. A check 1620 can be made for any boundary vertices (i.e., vertices that connect boundary edges, which separate the two portions of the mesh) that are not 2-manifold (i.e., the vertex connects more than two boundary edges). Thus, checking 1620 for any non-manifold boundary vertices involves finding vertices that (i) lie on a boundary between the first portion and the second portion and (ii) connect more than two boundary edges that lie on the boundary between the first portion and the second portion. For further details, see section 3.1 above and in connection with FIG. 7.

For each such non-manifold boundary vertex found, one or more incident triangles that include the non-manifold boundary vertex is reassigned from the first (incident/non-organic) portion to the second (organic/non-incident) portion of the mesh. Note that such reassignments change the boundary between the two portions of the mesh, resulting in a change in the boundary edges and therefore the boundary vertices. Thus, a single pass may not be sufficient, and the process can include iteratively repeating the checking 1620 and the reassigning 1625 until no non-manifold boundary vertices remain. This can involve a check 1630 to determine if any reassignments were made in the last iteration through the boundary vertices. Once no further reassignments of triangles are needed, the process ends.

Returning to FIG. 15, once the partitioning 1520 is completed, one or more editable smooth surfaces are constructed 1525, e.g., by the CAD program(s) 1404, for the second portion of the polygon mesh. Each of the one or more editable smooth surfaces has a globally smooth parameterization, which permits globally smooth free-form surface editing. As noted above various types of surface definition formats can be used, including, T-NURCCs, T-splines, LR B-splines, and/or hierarchical B-splines. Various approaches can be used to construct 1525 editable smooth surface(s), including one or more of the approaches described above in section 4, one or more of the approaches described below in connection with FIG. 17, and/or one or more of the approaches described in U.S. patent application Ser. No. 16/388,771, filed Apr. 18, 2019, and issued as U.S. Pat. No. 11,016,470 on May 25, 2021.

One or more boundaries of the one or more editable smooth surfaces are modified 1530, e.g., by the CAD program(s) 1404, to contact the one or more input solids (or one or more other modelled solids corresponding to regular geometric shapes fit to a scanned mesh) at one or more contact curves that are homeomorphic to an unmodified boundary between the one or more modified smooth surfaces and the one or more input solids (or one or more other modelled solids corresponding to regular geometric shapes fit to the scanned mesh). This ensures that the smooth surfaces constructed from the organic portion of the mesh will fully contact the input solid(s) (or other modelled solid(s) corresponding to regular geometric shape(s) fit to the scanned mesh). Thus, the final 3D model will be watertight. The modifying 1530 of the one or more editable smooth surfaces can include one or more of the approaches described above in section 5, and/or one or more of the approaches described below in connection with FIG. 17.

The one or more modified smooth surfaces are then combined 1535, e.g., by the CAD program(s) 1404, with the one or more input solids (or other modelled solid(s) corresponding to regular geometric shape(s) fit to the scanned mesh) to form a second 3D model of the object to be manufactured. The second 3D model includes the one or more modified smooth surfaces in contact with one or more portions of the one or more input solids (or other modelled solid(s)) in the boundary representation format at one or more gap-free contact curves. The second 3D model is watertight, and each of the one or more gap-free contact curves and each of the one or more modified smooth surfaces is editable using free-form modeling operations. The combining 1535 can include using Boolean operations that function on solids and oriented sheets or using cellular modelling techniques. The combining 1535 can include one or more of the approaches described above in section 6, and/or one or more of the approaches described below in connection with FIG. 17.

In addition in some implementations, additional processing can be performed on the second 3D model. For example, a check 1540 can be made to identify any of the one or more gap-free contact curves that do not providing at least tangent ($G^1$) continuity between a modified smooth surface and an input solid. When such contact curves are identified, a blend operation can be applied 1545 at the at least one of the one or more gap-free contact curves to provide at least tangent ($G^1$) continuity between the modified smooth surface and the input solid. Thus, one or more intersection curves between organic and incident regions can be replaced to improve the shape characteristics at one or more gap-free contact curves in the second 3D model. Other continuity checks and additional post-processing operations can also be performed, e.g., to make joint(s) have tangent ($G^1$) continuity or curve ($G^2$) continuity.

Moreover, in some implementation, the second 3D model can be provided 1550, e.g., by CAD program(s) 1404, for use in manufacturing a physical structure corresponding to the object using one or more computer-controlled manufacturing systems, e.g., AM machine 1495, SM machine 1495, and/or other manufacturing machines. The providing 1550 can involve saving the watertight 3D model to a permanent storage device for use in manufacturing the physical structure corresponding to the object using the one or more computer-controlled manufacturing systems, e.g., AM machine 1495 and/or SM machine 1495. In some implementations, the providing 1550 involves generating 1552, e.g., by CAD program(s) 1404, toolpath specifications for the computer-controlled manufacturing system(s) (e.g., AM machine 1495 and/or SM machine 1495) using the second 3D model, and manufacturing 1554, e.g., by CAD program(s) 1404, at least a portion of the physical structure corresponding to the object with the computer-controlled manufacturing system(s) (e.g., AM machine 1495 and/or SM machine 1495) using the toolpath specifications generated for the additive manufacturing machine (e.g., AM machine 1495 and/or SM machine 1495).

Figure 17:
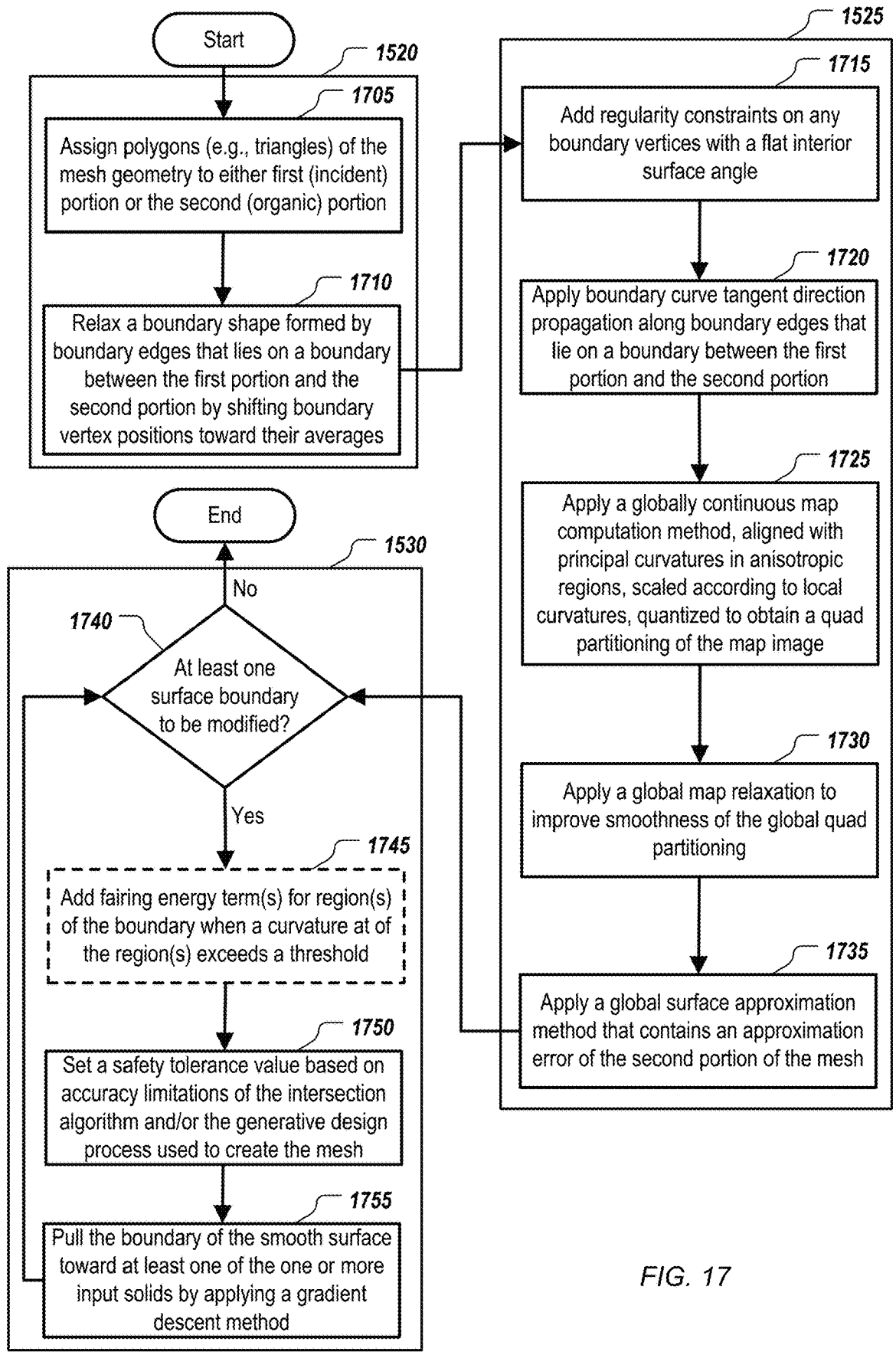
FIG. 17 shows an example of a process to partition mesh geometry, construct one or more editable smooth surfaces for an organic portion of the mesh geometry, and modify one or more boundaries of the one or more editable smooth surfaces.

FIG. 17 shows an example of a process to partition 1520 mesh geometry, construct 1525 one or more editable smooth surfaces for an organic portion of the mesh geometry, and modify 1530 one or more boundaries of the one or more editable smooth surfaces. Polygons of the mesh geometry are assigned 1705, e.g., by CAD program(s) 1404, to either the first (incident/non-organic) portion or the second (organic/non-incident) portion of the mesh. Then, one or more additional processing operations are performed at the organic boundary as part of the partitioning process, such as described above in section 3 and in connection with FIG. 16. This additional processing can include relaxing 1710, e.g., by CAD program(s) 1404, a boundary shape formed by boundary edges that lie on a boundary between the first portion and the second portion by at least in part shifting boundary vertex positions towards their averages to decrease angular and length deviations on the boundary shape. Further details of the relaxing 1710 are provided above in section 3.3.

For the constructing, regularity constraints are added 1715, e.g., by CAD program(s) 1404, on any boundary vertices with a flat interior surface angle. Further details for this are provided above in section 4.1 and in connection with FIG. 11. Boundary curve tangent direction propagation is applied 1720, e.g., by CAD program(s) 1404, along boundary edges that lie on a boundary between the first portion and the second portion. Further details for this are provided above in section 4.1.

A globally continuous map computation method is applied 1725, e.g., by CAD program(s) 1404, where the globally continuous map computation method is aligned with principal curvatures in anisotropic regions, scaled according to local curvatures, and quantized to obtain a quad partitioning of the map image. A global map relaxation is applied 1730, e.g., by CAD program(s) 1404, to improve smoothness of the global quad partitioning. Further details of the globally continuous map computation and global map relaxation are provided above in section 4.3. Moreover, a global surface approximation method is applied 1735, e.g., by CAD program(s) 1404, that contains an approximation error of the second portion of the mesh. Further details for this are provided above in section 4.4.

One or more boundaries of the one or more editable smooth surfaces are modified, e.g., by CAD program(s) 1404, to contact the modelled solid(s). While at least one surface boundary remains 1740 to be modified, the process continues, and once all the smooth surface boundaries have been modified to contact the modelled solid(s) the process ends. A safety tolerance value is set 1750, e.g., by CAD program(s) 1404, for the modifying based on accuracy limitations of (i) an intersection algorithm employed by the modifying (e.g., a Boolean operation) and/or (ii) the mesh's representation of the generative design created by the generative design process (or of the scanned physical object). Further details regarding safety tolerance values are provided above in section 5.3. The next boundary of an editable smooth surface is pulled 1755, e.g., by CAD program(s) 1404, toward at least one of the modelled solids by applying a gradient descent method for a distance function for the input solid evaluated for the pulled boundary. Further details for this are provided above in section 5.2. In some implementations, the safety tolerance value is iteratively adjusted to ensure the one or more contact curves of the one or more modified smooth surfaces with the one or more input solids are homeomorphic to the unmodified boundary. Thus, the check 1740 can include a check that the pulled boundary's curve is homeomorphic with $\partial O$ before that boundary is done being modified.

In addition, in some cases, the pull algorithm can cause small surface self-intersections near high-curvature regions of $\partial O$, resulting in organic surface defects. If a surface self-intersection overlaps with the contact curve $C=\partial S \cap O$, the intersection algorithm can fail to compute C. To address this issue, an optional step can include adding 1745, e.g., by CAD program(s) 1404, one or more fairing energy terms (Halstead, M., Kass, M., and DeRose, T., Efficient, fair interpolation using Catmull-Clark surfaces, Proc. of SIGGRAPH 93, pp. 35-44, 1993) for one or more regions of the boundary when a curvature of the one or more regions near the boundary exceeds a threshold, thus mitigating this issue.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a non-transitory computer-readable medium for execution by, or to control the operation of, data processing apparatus. The computer-readable medium can be a manufactured product, such as a hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, (e.g., code that constitutes processor firmware, a protocol stack, a database management system, an operating system, a runtime environment, or a combination of one or more of them). In addition, the apparatus can employ various different computing model infrastructures, such as web services, distributed computing and grid computing infrastructures.

A computer program (also known as a program, software, software application, script, or code) can be written in any suitable form of programming language, including compiled or interpreted languages, declarative or procedural languages, and it can be deployed in any suitable form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM (Erasable Programmable Read-Only Memory), EEPROM (Electrically Erasable Programmable Read-Only Memory), and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., an LCD (liquid crystal display) display device, an OLED (organic light emitting diode) display device, or another monitor, for displaying information to the user, and a keyboard and a pointing device, e.g., a mouse or a trackball, by which the user can provide input to the computer. Other kinds of devices can be used to provide for interaction with a user as well; for example, feedback provided to the user can be any suitable form of sensory feedback, e.g., visual feedback, auditory feedback, or tactile feedback; and input from the user can be received in any suitable form, including acoustic, speech, or tactile input.

The computing system can include clients and servers. A client and server are generally remote from each other and typically interact through a communication network. The relationship of client and server arises by virtue of computer programs running on the respective computers and having a client-server relationship to each other. Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described is this specification, or any combination of one or more such back-end, middleware, or front-end components. The components of the system can be interconnected by any suitable form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

While this specification contains many implementation details, these should not be construed as limitations on the scope of what is being or may be claimed, but rather as descriptions of features specific to particular embodiments of the disclosed subject matter. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In addition, the actions recited in the claims can be performed in a different order and still achieve desirable results.

What is claimed is:

1. A method comprising:
    obtaining a first three-dimensional model of an object, wherein the first three-dimensional model comprises a polygon mesh;
    partitioning the polygon mesh into a first portion corresponding to one or more solids and a second portion not corresponding to the one or more solids, wherein the one or more solids are in a boundary representation format;
    constructing one or more editable smooth surfaces for the second portion of the polygon mesh;
    modifying one or more boundaries of the one or more editable smooth surfaces to contact the one or more solids at one or more gap-free contact curves that are homeomorphic with the one or more boundaries, thereby forming one or more modified smooth surfaces; and
    combining the one or more modified smooth surfaces with the one or more solids to form a second three-dimensional model of the object, wherein the second three-dimensional model comprises the one or more modified smooth surfaces in watertight contact with one or more portions of the one or more solids in the boundary representation format at the one or more gap-free contact curves.

2. The method of claim 1, wherein the obtaining comprises receiving the polygon mesh from a generative design process that used the one or more solids in the generative design process, and each of the one or more gap-free contact curves and each of the one or more modified smooth surfaces is editable using free-form modeling operations.

3. The method of claim 2, wherein the generative design process employs a level set method, the polygon mesh is extracted from a level set representation of the object, the method comprises propagating incidence attributes from grid points in the level set representation to vertices of the polygon mesh, and the grid points comprise grid points that are on or inside the one or more solids and that participate in the polygon mesh extraction.

4. The method of claim 1, wherein the partitioning comprises assigning polygons of the polygon mesh to the first portion in accordance with a polygon having at least one vertex that is contained by at least one of the one or more solids or is within a threshold distance of a surface of the at least one of the one or more solids, and the threshold distance is based on a discretization accuracy of the polygon mesh.

5. The method of claim 4, wherein the assigning comprises initially assigning the polygon to the first portion responsive to the polygon having each of the polygon's vertices being contained by the at least one of the one or more solids or being within the threshold distance of the surface of the at least one of the one or more solids, and the partitioning comprises reassigning the polygon from the first portion to the second portion responsive to the polygon including a boundary vertex that (i) lies on a boundary between the first portion and the second portion and (ii) connects more than two boundary edges that lie on the boundary between the first portion and the second portion.

6. The method of claim 1, comprising smoothing one or more piecewise-linear curves of a boundary between the first portion and the second portion.

7. The method of claim 6, comprising remeshing polygons around the one or more piecewise-linear curves of the boundary between the first portion and the second portion, and wherein the smoothing comprises shifting boundary vertex positions towards their averages.

8. The method of claim 6, comprising, before the smoothing:
adding regularity constraints on one or more boundary vertices with a flat interior surface angle; and
applying boundary curve tangent direction propagation along the one or more piecewise-linear curves of the boundary between the first portion and the second portion.

9. The method of claim 1, wherein the constructing comprises fitting the one or more editable smooth surfaces to the second portion of the polygon mesh to form at least one globally smooth free-form surface that deviates from the polygon mesh no further than a specified approximation tolerance.

10. The method of claim 9, wherein the constructing comprises computing an anisotropic adaptive size-field that specifies control mesh edge length sizes for the one or more editable smooth surfaces.

11. The method of claim 9, wherein the constructing comprises computing cross, size and field-guided quad parameterization of the second portion of the polygon mesh.

12. The method of claim 1, wherein the constructing comprises obtaining a quantized globally continuous map, and the one or more editable smooth surfaces comprise one or more Non-Uniform Rational Catmull-Clark Surfaces with T-junctions (T-NURCC) or T-Spline surfaces.

13. The method of claim 1, wherein the modifying comprises:
pulling at least one boundary of the one or more editable smooth surfaces toward at least one of the one or more solids;
setting a safety tolerance value for the modifying based on an accuracy limitation; and
adjusting the safety tolerance value to ensure the one or more gap-free contact curves are homeomorphic with the one or more boundaries.

14. The method of claim 13, wherein the one or more solids comprise two solids having a minimum distance between the two solids, and the method comprises expanding at least one of the two solids responsive to the minimum distance being smaller than the accuracy limitation.

15. The method of claim 13, comprising adding at least one fairing energy term for at least one region of the at least one boundary responsive to a curvature of the at one region of the at least one boundary exceeding a threshold.

16. The method of claim 1, wherein the combining comprises using cellular modelling techniques.

17. The method of claim 1, comprising applying a blend to at least one contact curve of the one or more gap-free contact curves responsive to the at least one contact curve not providing at least tangent continuity with the one or more solids.

18. The method of claim 1, wherein the obtaining comprises receiving the polygon mesh, and the partitioning comprises fitting one or more regular geometrical shapes to the polygon mesh to determine the one or more solids.

19. The method of claim 18, wherein the object is a physical object, and the polygon mesh was produced by a scanner than scanned the physical object.

20. A non-transitory computer readable medium encoding instructions of a computer program operable to cause one or more data processing apparatus to perform operations comprising:
obtaining a first three-dimensional model of an object, wherein the first three-dimensional model comprises a polygon mesh;
partitioning the polygon mesh into a first portion corresponding to one or more solids and a second portion not corresponding to the one or more solids, wherein the one or more solids are in a boundary representation format;
constructing one or more editable smooth surfaces for the second portion of the polygon mesh;
modifying one or more boundaries of the one or more editable smooth surfaces to contact the one or more solids at one or more gap-free contact curves that are homeomorphic with the one or more boundaries, thereby forming one or more modified smooth surfaces; and
combining the one or more modified smooth surfaces with the one or more solids to form a second three-dimensional model of the object, wherein the second three-dimensional model comprises the one or more modified smooth surfaces in watertight contact with one or more portions of the one or more solids in the boundary representation format at the one or more gap-free contact curves.

21. The non-transitory computer readable medium of claim 20, wherein the obtaining comprises receiving the polygon mesh from a generative design process that used the one or more solids in the generative design process, and each of the one or more gap-free contact curves and each of the one or more modified smooth surfaces is editable using free-form modeling operations.

22. The non-transitory computer readable medium of claim 21, wherein the generative design process employs a level set method, the polygon mesh is extracted from a level set representation of the object, the operations comprises propagating incidence attributes from grid points in the level set representation to vertices of the polygon mesh, and the grid points comprise grid points that are on or inside the one or more solids and that participate in the polygon mesh extraction.

23. The non-transitory computer readable medium of claim 20, wherein the partitioning comprises assigning polygons of the polygon mesh to the first portion in accordance with a polygon having at least one vertex that is contained by at least one of the one or more solids or is within a threshold distance of a surface of the at least one of the one or more solids, and the threshold distance is based on a discretization accuracy of the polygon mesh.

24. The non-transitory computer readable medium of claim 23, wherein the assigning comprises initially assigning the polygon to the first portion responsive to the polygon having each of the polygon's vertices being contained by the at least one of the one or more solids or being within the threshold distance of the surface of the at least one of the one or more solids, and the partitioning comprises reassigning the polygon from the first portion to the second portion responsive to the polygon including a boundary vertex that (i) lies on a boundary between the first portion and the second portion and (ii) connects more than two boundary edges that lie on the boundary between the first portion and the second portion.

25. The non-transitory computer readable medium of claim 20, wherein the operations comprise smoothing one or more piecewise-linear curves of a boundary between the first portion and the second portion.

26. The non-transitory computer readable medium of claim 25, wherein the operations comprise remeshing polygons around the one or more piecewise-linear curves of the boundary between the first portion and the second portion, and wherein the smoothing comprises shifting boundary vertex positions towards their averages.

27. The non-transitory computer readable medium of claim 25, wherein the operations comprise, before the smoothing:
adding regularity constraints on one or more boundary vertices with a flat interior surface angle; and
applying boundary curve tangent direction propagation along the one or more piecewise-linear curves of the boundary between the first portion and the second portion.

28. The non-transitory computer readable medium of claim 20, wherein the constructing comprises fitting the one or more editable smooth surfaces to the second portion of the polygon mesh to form at least one globally smooth free-form surface that deviates from the polygon mesh no further than a specified approximation tolerance.

29. The non-transitory computer readable medium of claim 28, wherein the constructing comprises computing an anisotropic adaptive size-field that specifies control mesh edge length sizes for the one or more editable smooth surfaces.

30. The non-transitory computer readable medium of claim 28, wherein the constructing comprises computing cross, size and field-guided quad parameterization of the second portion of the polygon mesh.

31. The non-transitory computer readable medium of claim 20, wherein the constructing comprises obtaining a quantized globally continuous map, and the one or more editable smooth surfaces comprise one or more Non-Uniform Rational Catmull-Clark Surfaces with T-junctions (T-NURCC) or T-Spline surfaces.

32. The non-transitory computer readable medium of claim 20, wherein the modifying comprises:
pulling at least one boundary of the one or more editable smooth surfaces toward at least one of the one or more solids;
setting a safety tolerance value for the modifying based on an accuracy limitation; and
adjusting the safety tolerance value to ensure the one or more gap-free contact curves are homeomorphic with the one or more boundaries.

33. The non-transitory computer readable medium of claim 32, wherein the one or more solids comprise two solids having a minimum distance between the two solids, and the operations comprise expanding at least one of the two solids responsive to the minimum distance being smaller than the accuracy limitation.

34. The non-transitory computer readable medium of claim 32, wherein the operations comprise adding at least one fairing energy term for at least one region of the at least one boundary responsive to a curvature of the at one region of the at least one boundary exceeding a threshold.

35. The non-transitory computer readable medium of claim 20, wherein the combining comprises using cellular modelling techniques.

36. The non-transitory computer readable medium of claim 20, wherein the operations comprise applying a blend to at least one contact curve of the one or more gap-free contact curves responsive to the at least one contact curve not providing at least tangent continuity with the one or more solids.

37. The non-transitory computer readable medium of claim 20, wherein the obtaining comprises receiving the polygon mesh, and the partitioning comprises fitting one or more regular geometrical shapes to the polygon mesh to determine the one or more solids.

38. The non-transitory computer readable medium of claim 37, wherein the object is a physical object, and the polygon mesh was produced by a scanner than scanned the physical object.

39. A system comprising:
a non-transitory storage medium having instructions of a computer program stored thereon; and
one or more data processing apparatus configured to run the instructions of the computer program to
obtain a first three-dimensional model of an object, wherein the first three-dimensional model comprises a polygon mesh,
partition the polygon mesh into a first portion corresponding to one or more solids and a second portion not corresponding to the one or more solids, wherein the one or more solids are in a boundary representation format,
construct one or more editable smooth surfaces for the second portion of the polygon mesh, modify one or more boundaries of the one or more editable smooth surfaces to contact the one or more solids at one or more gap-free contact curves that are homeomorphic with the one or more boundaries, thereby forming one or more modified smooth surfaces, and combine the one or more modified smooth surfaces with the one or more solids to form a second three-dimensional model of the object, wherein the second three-dimensional model comprises the one or more modified smooth surfaces in watertight contact with one or more portions of the one or more solids in the boundary representation format at the one or more gap-free contact curves.

40. The system of claim 39, wherein the one or more data processing apparatus are configured to run the instructions of the computer program to receive the polygon mesh from a generative design process that used the one or more solids in the generative design process, and each of the one or more gap-free contact curves and each of the one or more modified smooth surfaces is editable using free-form modeling operations.

41. The system of claim 40, wherein the generative design process employs a level set method, the polygon mesh is extracted from a level set representation of the object, the one or more data processing apparatus are configured to run the instructions of the computer program to propagate incidence attributes from grid points in the level set representation to vertices of the polygon mesh, and the grid points comprise grid points that are on or inside the one or more solids and that participate in the polygon mesh extraction.

42. The system of claim 39, wherein the one or more data processing apparatus are configured to run the instructions of the computer program to assign polygons of the polygon mesh to the first portion in accordance with a polygon having at least one vertex that is contained by at least one of the one or more solids or is within a threshold distance of a surface of the at least one of the one or more solids, and the threshold distance is based on a discretization accuracy of the polygon mesh.

43. The system of claim 42, wherein the one or more data processing apparatus are configured to run the instructions of the computer program to initially assign the polygon to the first portion responsive to the polygon having each of the polygon's vertices being contained by the at least one of the one or more solids or being within the threshold distance of the surface of the at least one of the one or more solids, and the one or more data processing apparatus are configured to run the instructions of the computer program to reassign the polygon from the first portion to the second portion responsive to the polygon including a boundary vertex that (i) lies on a boundary between the first portion and the second portion and (ii) connects more than two boundary edges that lie on the boundary between the first portion and the second portion.

44. The system of claim 39, wherein the one or more data processing apparatus are configured to run the instructions of the computer program to smooth one or more piecewise-linear curves of a boundary between the first portion and the second portion.

45. The system of claim 44, wherein the one or more data processing apparatus are configured to run the instructions of the computer program to remesh polygons around the one or more piecewise-linear curves of the boundary between the first portion and the second portion, and the one or more data processing apparatus are configured to run the instructions of the computer program to shift boundary vertex positions towards their averages.

46. The system of claim 44, wherein the one or more data processing apparatus are configured to run the instructions of the computer program to, before the one or more piecewise-linear curves are smoothed:
add regularity constraints on one or more boundary vertices with a flat interior surface angle; and
apply boundary curve tangent direction propagation along the one or more piecewise-linear curves of the boundary between the first portion and the second portion.

47. The system of claim 39, wherein the one or more data processing apparatus are configured to run the instructions of the computer program to fit the one or more editable smooth surfaces to the second portion of the polygon mesh to form at least one globally smooth free-form surface that deviates from the polygon mesh no further than a specified approximation tolerance.

48. The system of claim 47, wherein the one or more data processing apparatus are configured to run the instructions of the computer program to compute an anisotropic adaptive size-field that specifies control mesh edge length sizes for the one or more editable smooth surfaces.

49. The system of claim 47, wherein the one or more data processing apparatus are configured to run the instructions of the computer program to compute cross, size and field-guided quad parameterization of the second portion of the polygon mesh.

50. The system of claim 39, wherein the one or more data processing apparatus are configured to run the instructions of the computer program to obtain a quantized globally continuous map, and the one or more editable smooth surfaces comprise one or more Non-Uniform Rational Catmull-Clark Surfaces with T-junctions (T-NURCC) or T-Spline surfaces.

51. The system of claim 39, wherein the one or more data processing apparatus are configured to run the instructions of the computer program to:
pull at least one boundary of the one or more editable smooth surfaces toward at least one of the one or more solids;
set a safety tolerance value for the modifying based on an accuracy limitation; and
adjust the safety tolerance value to ensure the one or more gap-free contact curves are homeomorphic with the one or more boundaries.

52. The system of claim 51, wherein the one or more solids comprise two solids having a minimum distance between the two solids, and the one or more data processing apparatus are configured to run the instructions of the computer program to expand at least one of the two solids responsive to the minimum distance being smaller than the accuracy limitation.

53. The system of claim 51, wherein the one or more data processing apparatus are configured to run the instructions of the computer program to add at least one fairing energy term for at least one region of the at least one boundary responsive to a curvature of the at one region of the at least one boundary exceeding a threshold.

54. The system of claim 39, wherein the one or more data processing apparatus are configured to run the instructions of the computer program to use cellular modelling techniques to combine the one or more modified smooth surfaces with the one or more solids.

55. The system of claim 39, wherein the one or more data processing apparatus are configured to run the instructions of the computer program to apply a blend to at least one contact curve of the one or more gap-free contact curves responsive to the at least one contact curve not providing at least tangent continuity with the one or more solids.

56. The system of claim 39, wherein the one or more data processing apparatus are configured to run the instructions of the computer program to receive the polygon mesh, and the one or more data processing apparatus are configured to run the instructions of the computer program to fit one or more regular geometrical shapes to the polygon mesh to determine the one or more solids.

57. The system of claim 56, wherein the object is a physical object, and the polygon mesh was produced by a scanner than scanned the physical object.

* * * * *

UNITED STATES PATENT AND TRADEMARK OFFICE
CERTIFICATE OF CORRECTION

PATENT NO. : 12,353,191 B2
APPLICATION NO. : 18/537713
DATED : July 8, 2025
INVENTOR(S) : Martin Cvetanov Marinov et al.

It is certified that error appears in the above-identified patent and that said Letters Patent is hereby corrected as shown below:

In the Claims

Column 32, Line 27, in Claim 15: after "at" insert --least--.

Column 32, Line 42, in Claim 19: delete "than" and insert --that--, therefor.

Column 34, Line 33, in Claim 34: after "at" insert --least--.

Column 34, Line 51, in Claim 38: delete "than" and insert --that--, therefor.

Column 36, Line 58, in Claim 53: after "at" insert --least--.

Column 37, Line 13, in Claim 57: delete "than" and insert --that--, therefor.

Signed and Sealed this
Sixteenth Day of September, 2025

Coke Morgan Stewart
*Acting Director of the United States Patent and Trademark Office*